(12) United States Patent
Tan et al.

(10) Patent No.: US 8,848,404 B2
(45) Date of Patent: Sep. 30, 2014

(54) POWER CONVERSION SYSTEM WITH TRANSIENT EVENT RIDE-THROUGH CAPABILITY AND METHOD THEREOF

(75) Inventors: Zhuohui Tan, Shanghai (CN); Xinhui Wu, Shanghai (CN); Xueqin Wu, Shanghai (CN); Maozhong Gong, Shanghai (CN); Xiaoming Guo, Shanghai (CN)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 13/558,990

(22) Filed: Jul. 26, 2012

(65) Prior Publication Data
US 2013/0027993 A1 Jan. 31, 2013

(30) Foreign Application Priority Data

Jul. 29, 2011 (CN) .......................... 2011 1 0217135

(51) Int. Cl.
*H02M 7/757* (2006.01)
*H02M 7/515* (2007.01)
*H02M 7/797* (2006.01)

(52) U.S. Cl.
CPC ............... *H02M 7/515* (2013.01); *Y02E 10/56* (2013.01)
USPC ................................ 363/40; 363/95; 363/140

(58) Field of Classification Search
USPC ......... 323/205, 207, 212, 215, 217, 219, 906; 363/2, 40, 65, 71, 95, 97, 98, 131, 132, 363/133, 140; 307/51, 52, 62, 82
See application file for complete search history.

(56) References Cited

U.S. PATENT DOCUMENTS

| | | | | |
|---|---|---|---|---|
| 6,229,278 B1 * | 5/2001 | Garces et al. | | 318/801 |
| 6,429,546 B1 * | 8/2002 | Ropp et al. | | 307/31 |
| 7,193,872 B2 * | 3/2007 | Siri | | 363/95 |
| 7,348,756 B2 * | 3/2008 | Ma et al. | | 318/803 |
| 7,889,527 B2 * | 2/2011 | Ohshima et al. | | 363/97 |
| 7,964,991 B2 * | 6/2011 | Siri | | 307/53 |
| 8,014,181 B2 * | 9/2011 | Tan et al. | | 363/74 |
| 8,295,063 B2 * | 10/2012 | Gong et al. | | 363/40 |
| 8,310,214 B2 * | 11/2012 | Garces Rivera et al. | | 323/207 |

(Continued)

OTHER PUBLICATIONS

O'Brien et al., "Power Conversion System and Method ", U.S. Appl. No. 13/324,154, filed Dec. 13, 2011.

(Continued)

*Primary Examiner* — Adolf Berhane
*Assistant Examiner* — Nusrat Quddus
(74) *Attorney, Agent, or Firm* — Global Patent Operation; Peter T. DiMauro

(57) ABSTRACT

An exemplary power conversion system is disclosed including a DC bus for receiving DC power; a line side converter electrically coupled to the DC bus for converting the DC power to AC power; and a voltage source controller to provide control signals to enable the line side converter to regulate the AC power. The voltage source controller comprises a signal generator to generate the control signals based at least in part on a power command signal and a power feedback signal. The voltage source controller further comprises a current limiter to, during a transient event, limit the control signals based at least in part on an electrical current threshold. The voltage source controller further comprises a voltage limiter to, during the transient event, limit the control signals based at least in part on a DC bus voltage feedback signal and a DC boundary voltage threshold.

18 Claims, 16 Drawing Sheets

(56) References Cited

U.S. PATENT DOCUMENTS

| | | | |
|---|---|---|---|
| 8,547,715 B2* | 10/2013 | Yuan et al. | 363/98 |
| 2006/0171182 A1 | 8/2006 | Siri et al. | |
| 2007/0223258 A1* | 9/2007 | Lai et al. | 363/37 |
| 2009/0216387 A1* | 8/2009 | Klein | 700/296 |
| 2009/0279936 A1* | 11/2009 | Kuykendall | 401/6 |
| 2010/0008119 A1* | 1/2010 | O'Brien et al. | 363/132 |
| 2010/0134076 A1* | 6/2010 | Cardinal et al. | 323/207 |
| 2010/0142237 A1* | 6/2010 | Yuan et al. | 363/97 |
| 2010/0157638 A1* | 6/2010 | Naiknaware et al. | 363/131 |
| 2010/0195361 A1* | 8/2010 | Stem | 363/132 |
| 2010/0213767 A1 | 8/2010 | Siri | |
| 2012/0314467 A1* | 12/2012 | O'Brien et al. | 363/131 |
| 2013/0207622 A1* | 8/2013 | YUAN et al. | 323/207 |

OTHER PUBLICATIONS

Unofficial English translation of CN Office Action issued Apr. 16, 2014 in connection with corresponding CN Patent Application No. 201110217135.X.

* cited by examiner

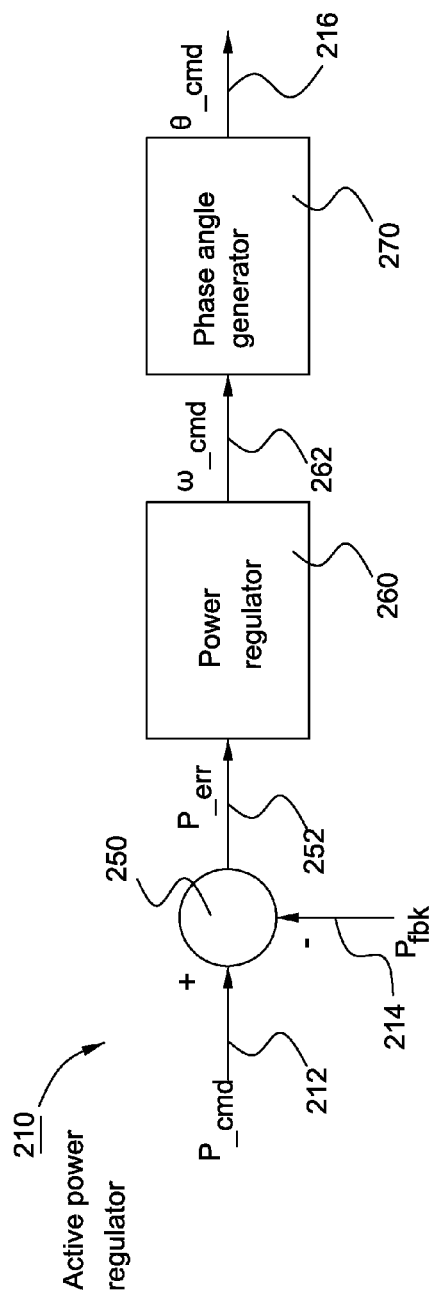
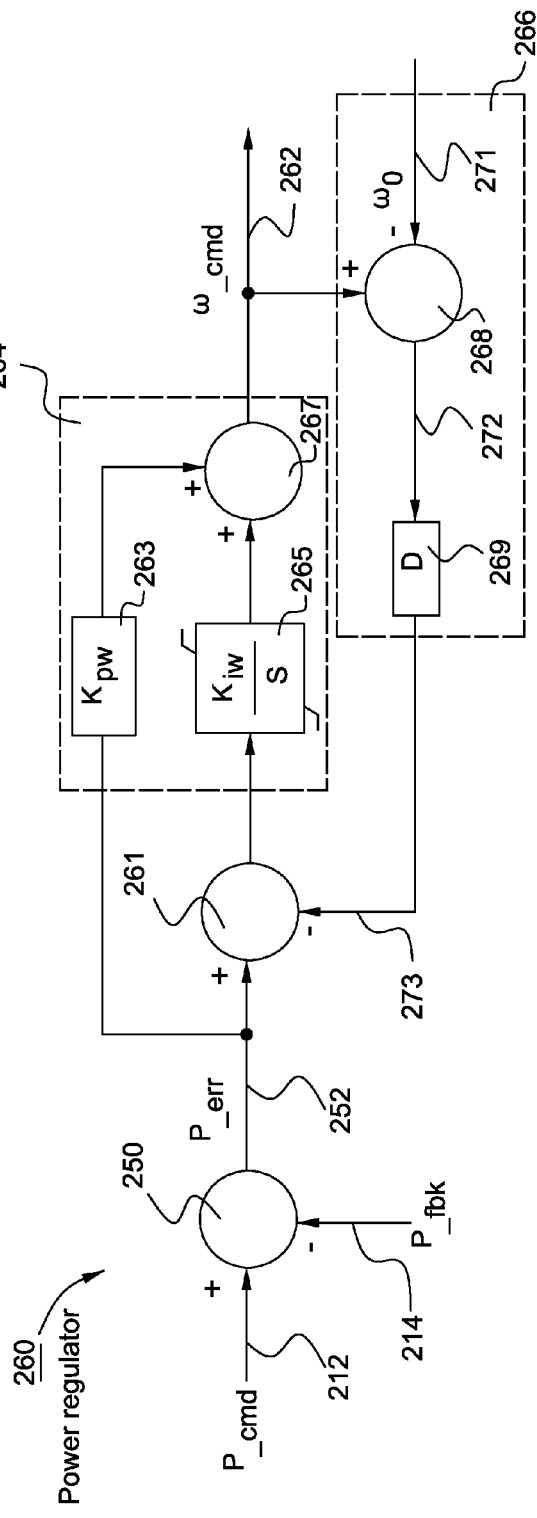
FIG. 3
FIG. 4

POWER CONVERSION SYSTEM WITH TRANSIENT EVENT RIDE-THROUGH CAPABILITY AND METHOD THEREOF

BACKGROUND OF THE INVENTION

Embodiments of the disclosure relate generally to power conversion systems and methods for converting and providing electrical power to feed an electrical system and, more particularly, to power conversion systems and methods with improved ride-through capability during transient events.

Renewable power, such as solar power generated by solar power generation systems, is becoming a larger source of energy throughout the world. A typical solar power generation system includes one or more photovoltaic arrays (PV arrays) having multiple interconnected solar cells. The solar cells of the PV arrays convert solar energy into DC power. In order to interface the output of the PV arrays to a power grid, a solar power converter is typically used to change the DC power from the PV arrays into AC power to feed a power grid.

Various solar power converter configurations exist for converting the DC power output from PV arrays into AC power. One implementation of a solar power converter has two stages including a DC-DC converter stage and a DC-AC converter stage. The DC-DC converter controls the flow of DC power from the PV arrays onto a DC bus. The DC-AC converter converts the DC power supplied to the DC bus into AC power that can be output to the power grid. Existing solar power converters further utilize power converter controller to regulate the DC-DC converter and the DC-AC converter to compensate for various system variables, such as DC bus voltage and AC grid voltage and frequency.

With the rapid growth of grid-connected solar power generation systems, solar power penetration into the power grid may have a significant impact on the grid voltage and frequency. A solar power generation system typically is required to remain connected to the power grid during transient events. One problem associated with certain transient events is that the DC-AC converter may be damaged when the current flowing through the DC-AC converter exceeds its hardware limitations. Another problem associated with transient events is that a power imbalance may appear at the DC bus when the output power of the grid varies significantly due to a change of the grid voltage and frequency.

Therefore, it is desirable to provide systems and methods to address the above-mentioned problems.

BRIEF DESCRIPTION OF THE INVENTION

In accordance with one embodiment disclosed herein, a power conversion system is provided. The power conversion system comprises a DC bus for receiving direct current (DC) power, a line side converter coupled to the DC bus for converting the DC power on the DC bus to alternating current (AC) power; and a voltage source controller configured to provide control signals to the line side converter to enable the line side converter to regulate the AC power. The voltage source controller comprises a signal generator to generate the control signals for the line side converter based at least in part on a power command signal and a power feedback signal. The voltage source controller further comprises a current limiter to, during a transient event, limit the control signals based at least in part on an electrical current threshold. The voltage source controller further comprises a voltage limiter to, during the transient event, limit the control signals based at least in part on a DC bus voltage feedback signal and a DC boundary voltage threshold.

In accordance with another embodiment disclosed herein, a method of operating a power conversion system is provided. The method comprises generating, by the line side controller, control signals based at least in part on a power command signal and a power feedback signal; limiting, during a transient event, the control signals based at least in part on an electrical current threshold or a DC bus boundary voltage threshold; and applying the limited control signals to the line side converter.

In accordance with yet another embodiment disclosed herein, a solar power conversion system is provided. The solar power conversion system comprises a DC bus for receiving direct current (DC) power from a photovoltaic (PV) power source; a line side converter coupled to the DC bus for converting the DC power on the DC bus to alternating current (AC) power; and a voltage source controller configured to generate control signals based at least in part on a power command signal and a power feedback signal, limit, during a transient event, the control signals based at least in part on an electrical current threshold and a DC boundary voltage limit, and apply the limited control signals to the line side converter to limit the electrical current of the line side converter when the power conversion system is experiencing the transient event.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a detailed control diagram of an active power regulator shown in FIG. 2 in accordance with an exemplary embodiment of the present disclosure;

FIG. 4 is a detailed control diagram of a power regulator of the active power regulator shown in FIG. 3 in accordance with an exemplary embodiment of the present disclosure;

DETAILED DESCRIPTION

Figure 1:
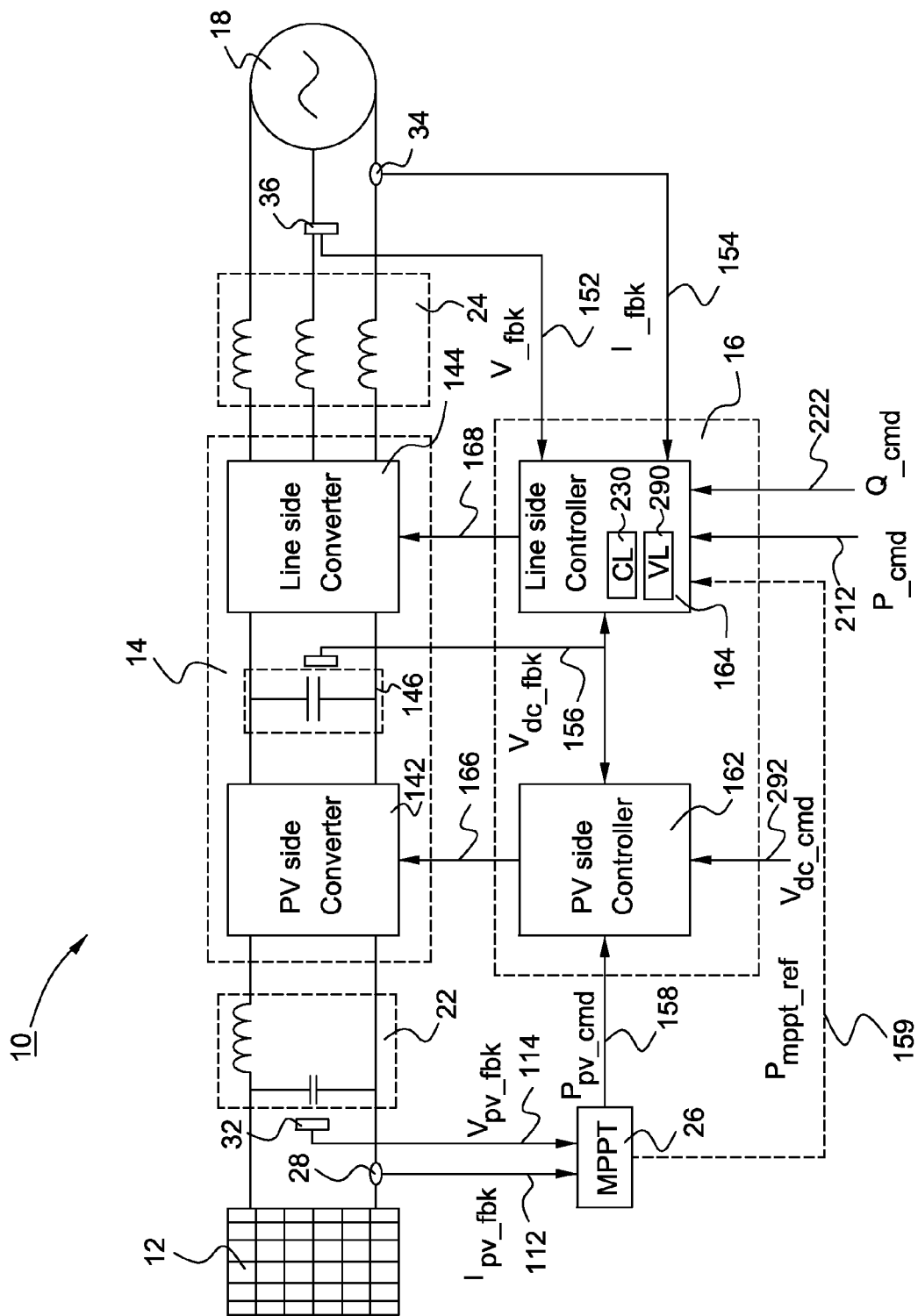
FIG. 1 is a schematic block diagram of a solar power conversion system in accordance with an exemplary embodiment of the present disclosure.

Embodiments disclosed herein relate generally to operating power conversion systems with improved ride-through capability. As used herein, the "ride-through capability" refers to a power conversion system being capable of maintaining its normal operations or being able to recover and return to normal operations in the event of transient events or fault conditions. The term of "transient event" and "fault condition" used herein may refer to one or more source side events or conditions occurring at a power source such as a PV power source for example, or refer to one or more load side events or conditions occurring at a load such as a power grid for example. More particularly, the implementation of the ride-through capability of the power conversion system described herein is based on a voltage source control structure or scheme. As used herein, "voltage source control structure or scheme" refers a control embodiment wherein one of the primary control parameters is AC voltage including a voltage magnitude command and a phase angle command of the power conversion system. In some embodiments, during a transient event such as a low voltage ride through (LVRT) event or a zero voltage ride through (ZVRT) event, a current limiter algorithm or more specifically a phasor current limiter is additionally used by the power conversion system to limit the current at the output of the power conversion system. Furthermore, during the LVRT transient events, a voltage limiter or a DC bus voltage boundary algorithm may be implemented in the line side controller to limit a DC bus voltage at a DC bus within a predefined boundary. Moreover, in some other embodiments, anti-windup feature may be provided in the power conversion system when the power conversion system is determined to be entering into the transient events or recovering from the transient events. As used herein, "anti-windup" refers to freezing one or more integrating elements after entering into the transient events or during the recovery process and resetting after the recovery process. In addition, in some embodiments, in generation of the phase angle command signal during the transient event, a power command signal may be limited using a source side power reference signal, such as, for example, a maximum power point tracking (MPPT) power reference signal from an MPPT circuit.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together (e.g., as one or more integrated circuit chips) to provide the described function.

FIG. 1 illustrates a block diagram of a power conversion system 10 in accordance with an exemplary embodiment of the present disclosure. Hereinafter, for better understanding the best mode of the present disclosure, the power conversion system 10 is illustrated and described as a solar power conversion system. However, a person having ordinary skill in the art will readily understand that one or more embodiments described herein should not be limited to solar applications, certain aspects of the disclosure can be applied in a similar manner to other power conversion systems, including fuel cell systems, wind power systems, and tidal power systems, for example.

In general, the solar power conversion system 10 includes a solar power converter 14 configured to interface between a solar power source 12 and a power grid 18. More specifically, the solar power converter 14 is configured to convert power in a form of direct current (DC) voltage or current (herein after referred to as DC power) generated from a solar power source 12 into power in the form of alternating current (AC) voltage or current (herein after referred to as AC power) suitable for feeding an electrical system shown as power grid 18. In one embodiment, the solar power source 12 may include one or more photovoltaic arrays (PV arrays) having multiple interconnected solar cells that can convert solar energy into DC power through the photovoltaic effect. In one embodiment, the electrical system 18 may comprise an AC power grid, and the solar power conversion system is configured for delivering nominally fixed frequency three-phase AC power.

In one implementation, the power converter 14 shown in FIG. 1 is based on a two-stage structure including a PV side converter 142 and a line side converter 144. The PV side converter 142 may comprise a DC-DC converter, such as a DC-DC boost converter, that steps up a DC voltage received from the power source 12 and outputs a higher DC voltage onto a DC bus 146. The DC bus 146 may include one or more capacitors for maintaining a constant DC voltage level at the DC bus 146, and thus the energy flow from the DC bus 146 to the power grid 18 can be managed. The line side converter 144 may comprise a DC-AC inverter that converts the DC voltage on the DC bus 146 to AC voltage suitable for feeding to the AC power grid 18. In other implementations, the power converter 14 may be based on a single stage converter structure including a DC-AC converter for converting DC voltage at a DC bus to AC voltage with suitable frequency and voltage magnitude to feed the power grid 18.

In one implementation, the power conversion system 10 shown in FIG. 1 further comprises a power converter controller 16 configured to regulate the PV power output from the solar power source 12 and regulate the active power or reactive power at the output of the line side converter 144. In one implementation, the power converter controller 16 is configured to have a PV side controller 162 and a line side controller 164. The PV side controller 162 is configured to send PV side control signals 166 to the PV side converter 142 to regulate the PV power output from the solar power source 12 according to various command signals and feedback signals. The line side controller 164 is configured to send line side control signals 168 to the line side converter 144 to regulate the active power or reactive power output from the line side converter 144 according to various command signals and feedback signals. In particular, as shown in FIG. 1, to deal with transient events, the line side controller 164 may be configured to implement a current limiter (CL) algorithm 230 to limit the current at the output of the line side converter 144. The line side controller 164 may be further configured to implement a voltage limiter (VL) algorithm 290 to limit a DC bus voltage at a DC bus within a predefined boundary. The PV side converter 162 may comprise any type of converter topology such as a half bridge converter, a full bridge converter, or a push-pull converter. The line side converter 144 may comprise any type of DC to AC converter topology such as a 2-level converter or a 3-level converter. The PV side converter 142 and the line side converter 144 may comprise a plurality of semiconductor switching devices (not shown), including but not limited to, integrated gate commutated thyristors (IGCTs) and insulated gate bipolar transistors (IGBTs). The switching devices are switched on and off in response to the PV side control signals 166 and the line side control signals 168 respectively. Although two controllers 162, 164 are illustrated, in other embodiments, a single controller may be used to control both the PV side converter 142 and the line side converter 144.

In one implementation, the power conversion system 10 shown in FIG. 1 may further comprise a PV side filter 22 having one or more capacitive and inductive elements for removing ripple components of the DC power output from the solar power source 12 and blocking ripple signals transmitted from the PV side converter 142 to the solar power source 12. The power conversion system 10 may further include a line side filter 24 having one or more inductive elements or capacitive elements (not shown) for removing harmonic signals for each phase of the three-phase AC power output from the line side converter 144.

In one implementation, the power conversion system 10 shown in FIG. 1 may further comprise a maximum power point tracking (MPPT) circuit 26. For purpose of illustration, the MPPT circuit 26 is shown to be located at the outside of the power converter controller 16. Alternatively, the MPPT circuit 26 may be configured within the power converter controller 16, or more specifically, configured within the PV side controller 162. In one embodiment, the MPPT circuit 26 may implement a perturbation and observation (P&O) algorithm to extract maximum power from the solar power source 12. In one implementation, the MPPT circuit 26 receives a feedback DC current signal 112 and a feedback DC voltage signal 114 measured by a current sensor 28 and a voltage sensor 32 placed at the output of the solar power source 12. The MPPT circuit 26 calculates an actual power currently obtained from the solar power source 12 by multiplying the DC current signal 112 and the DC voltage signal 114. The MPPT circuit 26 further compares the calculated currently obtained actual power with a previously calculated and stored one to observe the power variation. If the power variation is greater than zero, the subsequent recommended perturbation is made in the same direction, otherwise it is inverted. The MPPT circuit 26 then sends a voltage or current reference signal 158 to the PV side controller 162, which adjusts the control signals 166 accordingly. This process is repeated until a maximum power operating point or a point near the maximum power operating point of the solar power source 12 is found. In other embodiments, other algorithms such as, for example, incremental conductance algorithms may be implemented to extract maximum power from the solar power source 12.

As shown in FIG. 1, the MPPT circuit 26 is further configured in electrical communication with the line side controller 164. In implementation of the MPPT algorithm, an MPPT power reference signal 159 may be generated from the MPPT circuit 26 and supplied to the line side controller 164. In one embodiment, the MPPT power reference signal 159 is used for limiting a power command signal used for generating the line side control signals 168 for the line side converter 144. As such, the power provided from the solar power source 12 and the power output from the power converter 14 may be coordinated or balanced.

Further referring to FIG. 1, in normal operations, the power conversion system 10 or particularly the PV side controller 162 is responsible for controlling the DC voltage appearing at the DC bus 146. More specifically, the PV side controller 162 receives a DC voltage feedback signal 156 measured by a DC voltage sensor placed at the output of the DC bus 146. The PV side controller 162 further receives a DC voltage command signal 292. The PV side controller 162 adjusts the PV side control signals 166 according to the DC voltage feedback signal 156 and the DC voltage command signal 292, so as to maintain the DC voltage appearing at the DC bus 146 at a constant voltage level. In alternative embodiments, the line side controller 164 may be responsible for controlling the DC voltage appearing at the DC bus 146.

With continuing reference to FIG. 1, the power conversion system 10 or the line side controller 164 may be further configured with the capability of transient event ride-through control. For example, during grid transient events or fault conditions, the line side controller 164 can implement a current limit algorithm to limit the output current from the line side converter 144 such that the semiconductor devices residing in the line side converter 144 can be protected from overcurrent problems. Further, during grid transient events or fault conditions, the line side controller 164 can implement a voltage limit algorithm to limit the DC voltage at the DC bus 146 within an upper limit and a lower limit. As such, the DC bus 146 can be protected from overvoltage and collapse problems. More details of the current limit algorithm and the voltage limit algorithm will be described below.

Figure 2:
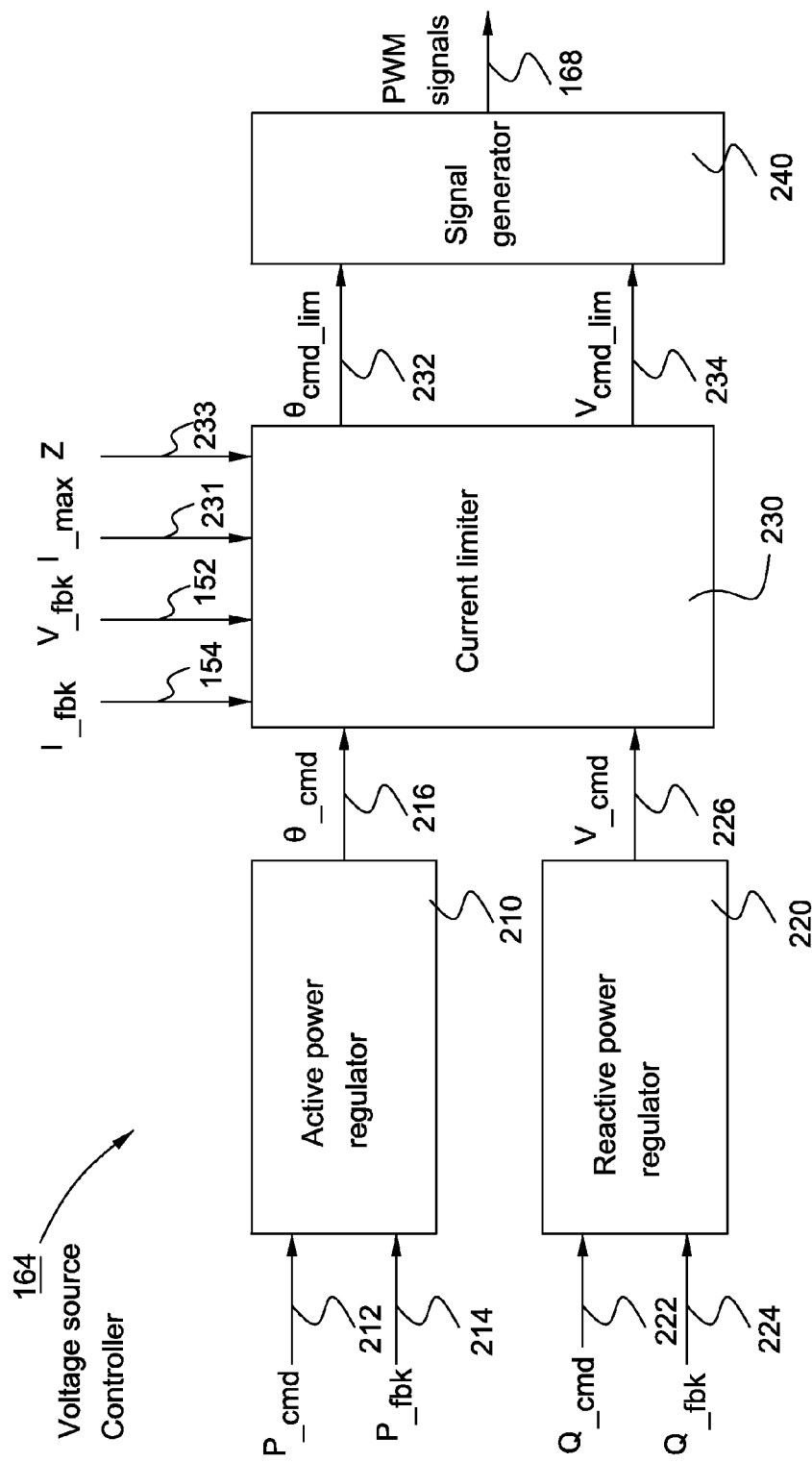
FIG. 2 is a control diagram implemented by a line side controller shown in FIG. 1 in accordance with an exemplary embodiment of the present disclosure.

FIG. 2 illustrates at least a part of an overall control diagram of the line side controller 164 in accordance with an exemplary embodiment of the present disclosure. The functional blocks illustrated in FIG. 2 can be implemented in hardware or software or a combination thereof. In practical applications, the line side controller 164 may be implemented by a micro-controller or a digital signal processor (DSP). In general, as shown in FIG. 2, in an exemplary embodiment, the line side controller 164 includes an active power regulator 210 for receiving power command and power feedback signals 212, 214 and generating a phase angle command signal 216, a reactive power regulator 220 for receiving reactive power command and reactive power feedback signals 222, 224 and generating a voltage magnitude command signal 226, a current limiter 230 for limiting the phase angle command signal 216 and the voltage magnitude command signal 226 according to one or more of a feedback current signal 154, a feedback voltage signal 228, a maximum allowable current threshold signal 231, and an impedance value 233, and a signal generator 240 for generating control signals 168 according to limited phase angle command signal 232 and limited voltage magnitude command signal 234.

In the illustrated embodiment of FIG. 2, the active power regulator 210 receives a power command signal 212 and a power feedback signal 214 and generates a phase angle command signal 216 based at least on the power command signal 212 and the power feedback signal 214. The power command signal 212 represents the desired power delivered between the output terminal of the line side converter 144 (see FIG. 1) and the grid 18 and may be dictated by a grid operator. The power feedback signal 214 is the actual measured power delivered between the output terminal of the line side converter 144 and the grid 18. The power feedback signal 214 may be obtained by multiplying a feedback current signal 154 and a feedback voltage signal 152. The feedback current signal 154 and feedback voltage signal 152 may be obtained from a current sensor 34 and a voltage sensor 36 placed between the line side converter 144 and the grid 18. It should be particularly pointed out that the phase angle command 216 being referenced herein may have some variations. In one embodiment, the phase angle command signal 216 generated from the active power regulator 210 represents a desired phase angle displacement or difference between a voltage at or adjacent to the grid 18 and an AC voltage of the line side converter 144. In another embodiment, the phase angle command signal 216 represents a desired phase angle of the AC voltage of the line side converter 144. The desired phase angle of the AC voltage of the line side converter 144 can be obtained by combining the phase angle of the grid voltage with the phase angle displacement. As described herein, the AC voltage of the line side converter 144 may be an AC voltage at the output terminal of the line side converter 144. Alternatively, the AC voltage of the line side converter 144 may comprise an internal voltage of the line side converter 144 by taking into consideration of the internal impedance of the line side converter 144. Furthermore, in some other embodiments, the AC voltage may be measured further along the line from the line side converter 144.

FIG. 3 illustrates a more detailed control diagram of the active power regulator 210 shown in FIG. 2 in accordance with one embodiment of the present disclosure. In the illustrated embodiment, the active power regulator 210 includes a summation element 250, a power regulator 260, and a phase angle generator 270. The summation element 250 subtracts the power feedback signal 214 from the power command signal 212 and provides a power error signal 252 representing a difference between the power command signal 212 and the power feedback signal 214. The power error signal 252 is supplied to the power regulator 260. The power regulator 260 generates a frequency command signal 262 according to the power error signal 252. The frequency command signal 262 is supplied to the phase angle generator 270. The phase angle generator 270 generates a phase angle command signal 216 according to the frequency command signal 262.

FIG. 4 illustrates a more detailed control diagram of the power regulator 260 shown in FIG. 3 in accordance with an exemplary embodiment of the present disclosure. In the illustrated embodiment, the power regulator 260 comprises a PI controller 264 configured to generate the frequency command signal 262 according to the power error signal 252. In one embodiment, the frequency command signal 262 is generated by combining the output from a proportional element 263 and the output from an integration element 265 through a summation element 267. In the illustrated embodiment, the power regulator 260 may optionally comprise a compensating unit 266. In general, the compensating unit 266 serves to ensure the stability of the power conversion system 10. In the illustrated embodiment, the compensating unit 266 comprises a proportional element 269 and a summation element 268. The proportional element 269 provides a damping factor to a frequency error signal 272 by a factor D. The output from the proportional element 269 is subtracted from the power error signal 252 by a summation element 261, which provides another power error signal to the integration element 265 for further calculation of the frequency command signal 262. The frequency error signal 272 is obtained by subtracting a fundamental frequency signal 271 from the frequency command signal 262 at the summation element 268. The fundamental frequency signal 271 represents a nominal angle speed of the AC voltage delivered to the power grid 18 or a measured angle speed obtained from a phase lock loop (PLL) circuit (see FIG. 8).

Figure 5:
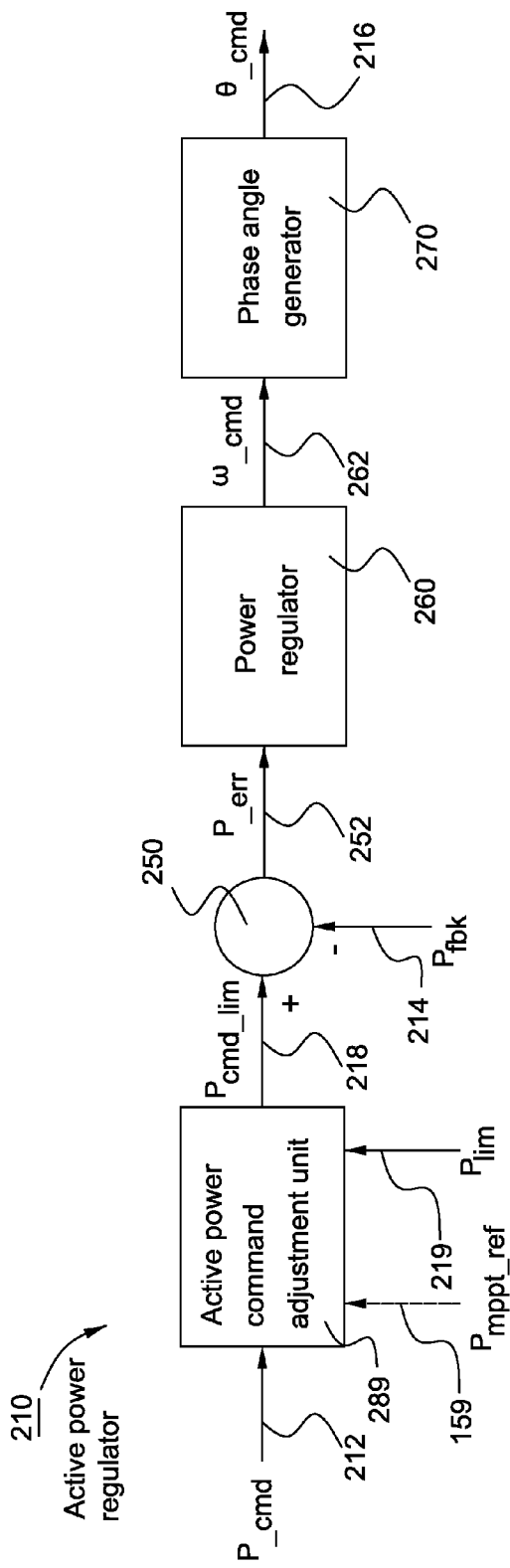
FIG. 5 is a detailed control diagram of an active power regulator shown in FIG. 2 in accordance with another exemplary embodiment of the present disclosure.

FIG. 5 illustrates a detailed control diagram of the active power regulator 210 shown in FIG. 2 in accordance with another embodiment of the present disclosure. The control diagram illustrated in FIG. 5 is similar to the control diagram shown in FIG. 3. One of the differences is that an active power command adjustment unit 289 is further provided in FIG. 5. The active power command adjustment unit 289 is configured to receive a power command signal 212 and a power limit signal 219 and generate a limited power command signal 218. In one embodiment, the power limit signal 219 is the MPPT power reference signal 159 output from the MPPT circuit 26 (shown in FIG. 1). By limiting the power command signal 212 during grid transients, an integration stress on the integration elements in the power regulator 260 and the phase angle generator 270 can be relieved. In another embodiment, the power limit signal 219 may be supplied to the active power command adjustment unit 289 based on hardware limitations of the power conversion system 10.

Figure 6:
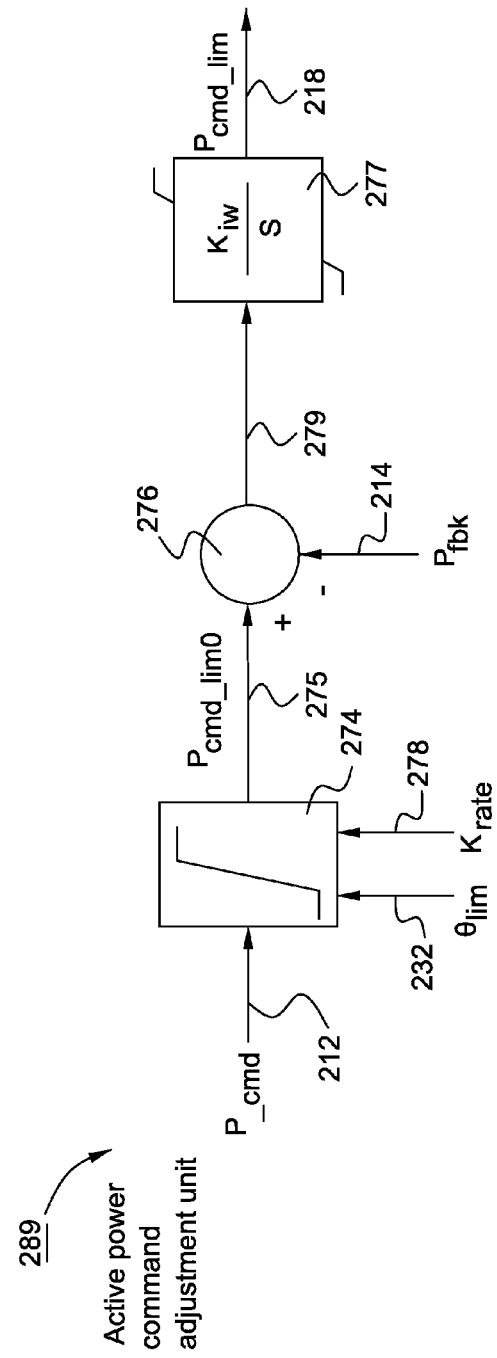
FIG. 6 is a detailed control diagram of an active power command adjustment unit shown in FIG. 5 in accordance with an exemplary embodiment of the present disclosure.

FIG. 6 illustrates a detailed control diagram of the active power command adjustment unit 289 shown in FIG. 5 in accordance with an exemplary embodiment of the present disclosure. In the illustrated embodiment, the active power command adjustment unit 289 includes a limiting element 274, a summation element 276, and an integration element 277. The limiting element 274 is configured to receive the power command signal 212 and constrain the power command signal 212 according to a phase angle limit signal 232 and a ramp rate control signal 278. The limited power command signal 275 generated from the limiting element 274 is supplied to the summation element 276, which provides a power error signal 279 representing a difference between the limited power signal 275 and the feedback power signal 214. The power error signal 279 is integrated in the integration element 277 to generate the limited power command signal 218, which is supplied to the summation element 250 shown in FIG. 5 for generation of the phase angle command signal 216.

Figure 7:
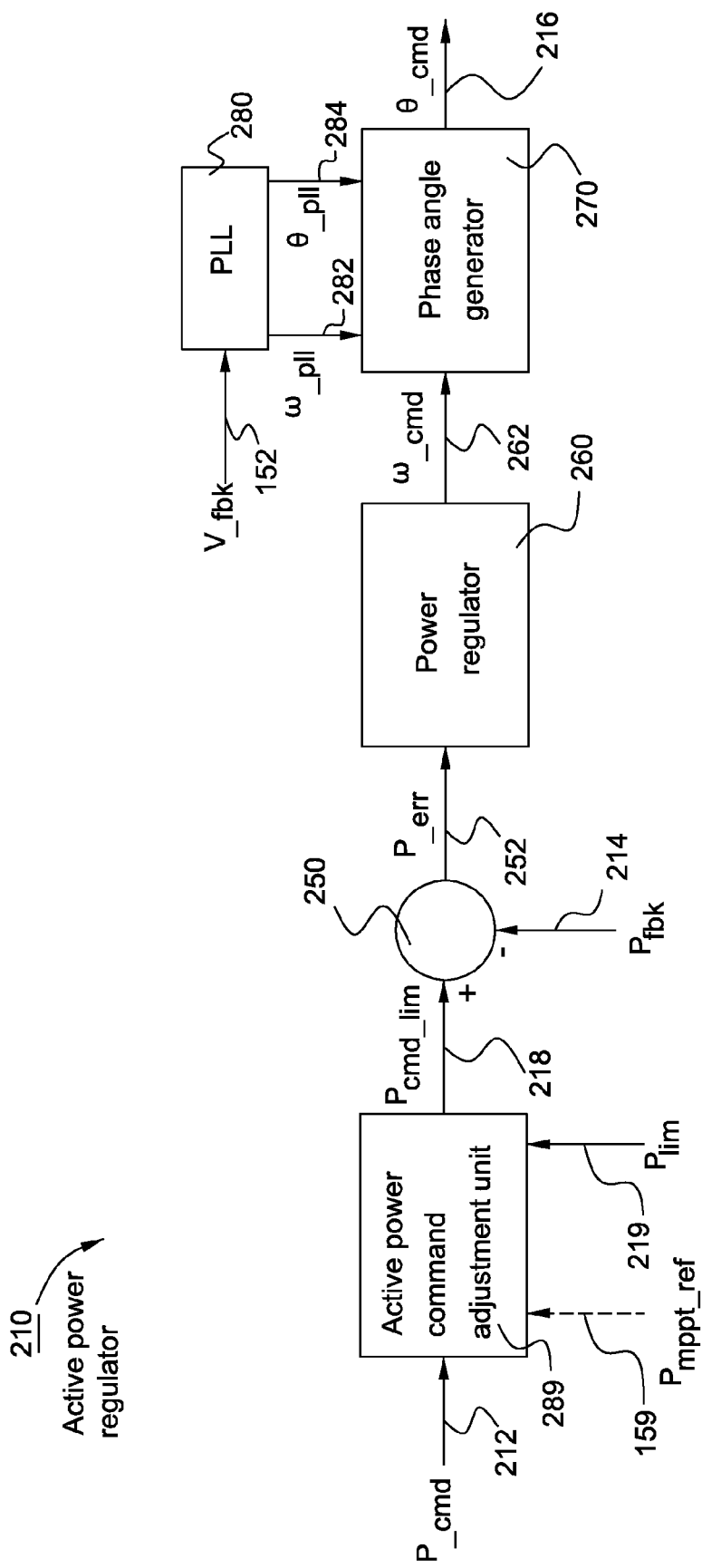
FIG. 7 is a detailed control diagram of an active power regulator shown in FIG. 2 in accordance with another exemplary embodiment of the present disclosure.

FIG. 7 illustrates a detailed control diagram of the active power regulator 210 shown in FIG. 2 in accordance with yet another embodiment of the present disclosure. The control diagram illustrated in FIG. 7 is similar to the control diagrams shown in FIG. 3 and FIG. 5. One of the differences is that a phase lock loop (PLL) circuit 280 is further provided in FIG. 7. The PLL circuit 280 is configured to receive a feedback voltage signal 152 from the grid 18 and generate a frequency reference signal 282 and a phase angle reference signal 284 according to the feedback voltage signal 152. The frequency reference signal 282 is used to adjust the frequency command signal 262. The phase angle reference signal 284 is used to adjust the phase angle command signal 216, which will be described with more detail below.

Figure 8:
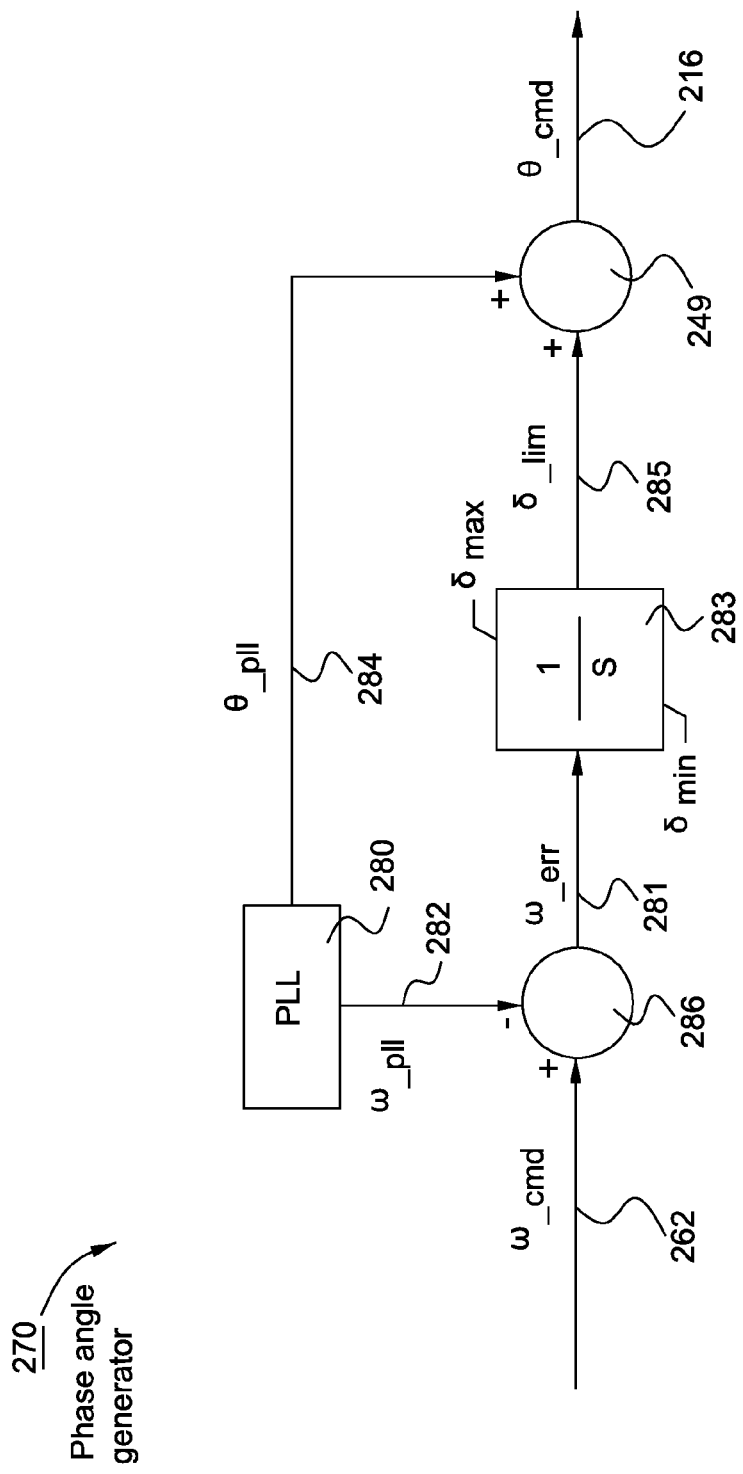
FIG. 8 is a detailed control diagram of a phase angle generator shown in FIG. 7 in accordance with an exemplary embodiment of the present disclosure.

FIG. 8 illustrates detailed control diagram of the phase angle generator 270 shown in FIG. 7 in association with the PLL circuit 280 in accordance with an exemplary embodiment of the present disclosure. In the illustrated embodiment, the phase angle generator 270 comprises a summation element 286, an integration element 283, and a summation element 249. The summation element 286 subtracts the frequency reference signal 282 from the frequency command signal 262 received from power regulator 260, and provides a frequency error signal 281 representing a difference between the frequency reference signal 282 and the frequency command signal 262. The frequency error signal 281 is integrated by the integrating element 283 and a phase angle displacement signal 285 is generated from the integrating element 283. The phase angle displacement signal 285 may be further limited (not shown in FIG. 8) within an upper phase angle threshold and a lower phase angle threshold (not shown in FIG. 8). The upper phase angle threshold and the lower phase angle threshold are predefined or calculated to ensure the power conversion system is capable of riding through transient events. One embodiment of calculating the upper and lower phase angle thresholds will be described later in reference to FIG. 18 and FIG. 19. The limited phase angle displacement signal 285 is combined with the phase angle reference signal 284 in the summation element 249, which provides an output as the phase angle command signal 216.

Figure 9:
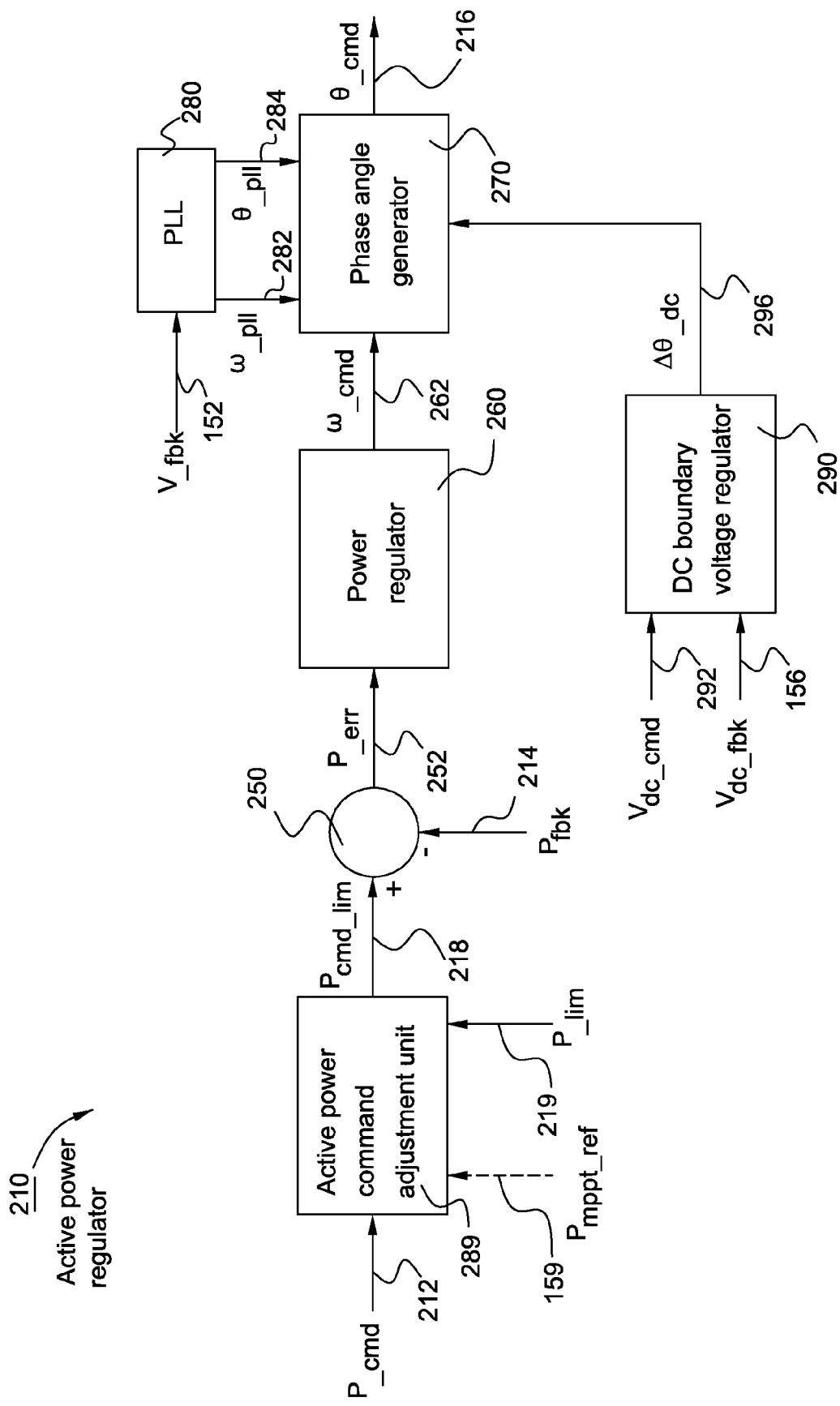
FIG. 9 is a detailed control diagram of an active power regulator shown in FIG. 2 in accordance with another exemplary embodiment of the present disclosure.

FIG. 9 illustrates a detailed control diagram of the active power regulator 210 shown in FIG. 2 in accordance with still another embodiment of the present disclosure. The control diagram illustrated in FIG. 9 is similar to the control diagrams shown in FIG. 3, FIG. 5, and FIG. 7. One of the differences is that a voltage limiter or a DC boundary voltage regulator 290 is further provided in FIG. 9. In the illustrated embodiment, the DC boundary voltage regulator 290 is configured to receive a DC voltage command signal 292 and a DC voltage feedback signal 156 and to generate a phase angle correction signal 296. The phase angle correction signal 296 is supplied to the phase angle generator 270, which uses the phase angle correction signal 296 to correct the phase angle command signal 216.

Figure 10:
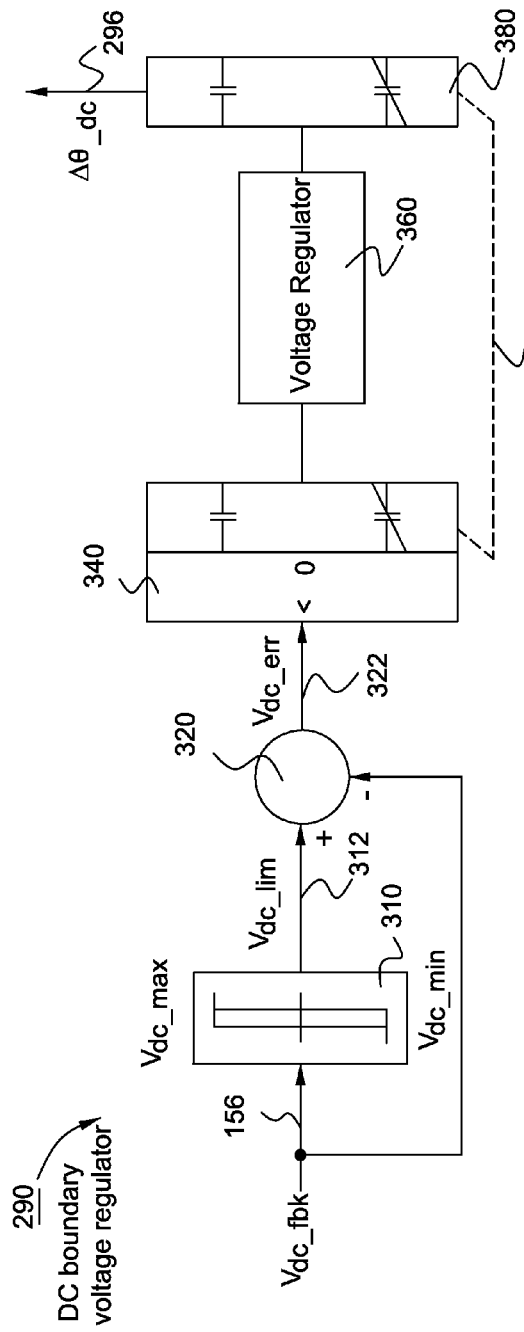
FIG. 10 is a detailed control diagram of a DC boundary voltage control unit shown in FIG. 9 in accordance with an exemplary embodiment of the present disclosure.

FIG. 10 illustrates a more detailed control diagram of the DC boundary voltage regulator 290 shown in FIG. 9 in accordance with an exemplary embodiment of the present disclosure. In the illustrated embodiment, the DC boundary voltage regulator 290 includes a voltage limiter 310, a summation element 320, a first logic device 340, a voltage regulator 360, and a second logic device 380. The voltage limiter 310 is set with an upper limit voltage value and a lower limit voltage value for limiting the input DC voltage feedback signal 156 and providing a limited DC voltage signal 312 within the voltage range defined by the upper limit voltage value and the lower limit voltage value. The summation element 320 subtracts the DC voltage feedback signal 156 from the limited DC voltage signal 312 to provide a DC voltage error signal 322. In normal operations, the DC voltage appearing at the DC bus 146 is located within the upper limit voltage value and the lower limit voltage value, such that the DC voltage error signal 322 provided from the summation element 320 is zero. In this case, the first logic element 340 and the second logic element 380 are switched off, so no phase angle correction signal 296 is supplied to the phase angle generator 270 shown in FIG. 9. When a grid transient event such as a low voltage ride through event occurs, the DC voltage appearing at the DC bus 146 may be temporarily dropped below the lower limit or driven higher than the upper limit due to power imbalance. In this case, DC voltage error signal 322 provided from the summation element 320 is non-zero, and the first logic element 340 and the second logic element 380 are switched on, such that the voltage regulator 360 provides the phase angle correction signal 296 to the phase angle generator 270, which will be described with more detail below in reference to FIG. 11.

Figure 11:
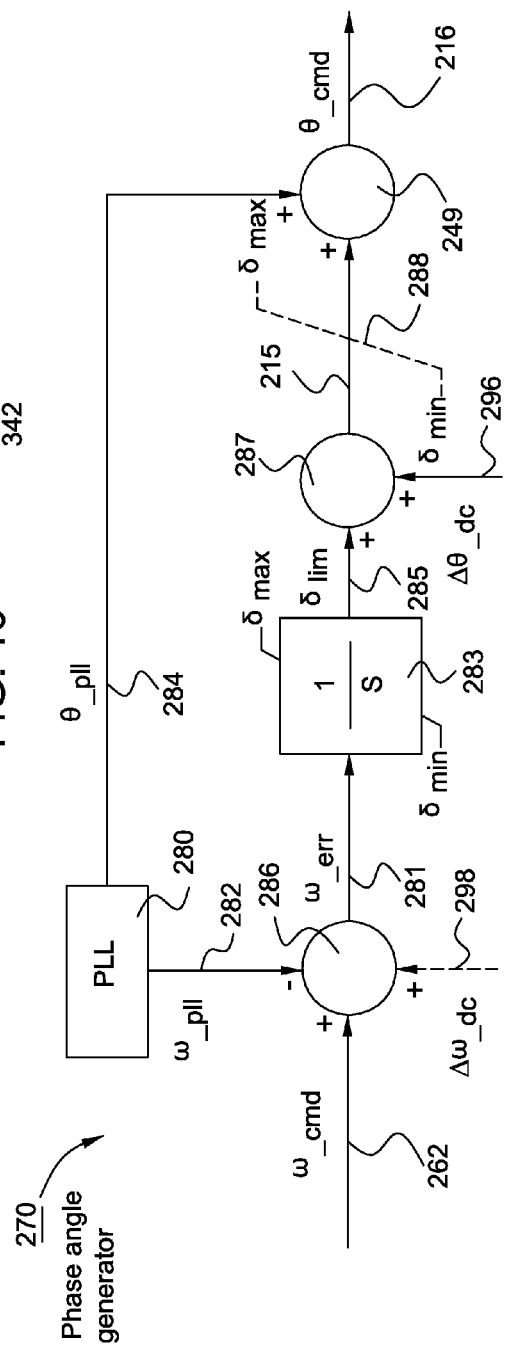
FIG. 11 is a detailed control diagram of a phase angle generator shown in FIG. 9 in accordance with an exemplary embodiment of the present disclosure.

FIG. 11 illustrates a detailed control diagram of the phase angle generator 270 shown in FIG. 9 in association with the PLL circuit 280 in accordance with an exemplary embodiment of the present disclosure. The control diagram shown in FIG. 11 is similar to the control diagram described above in reference to the FIG. 8. One of the differences is that, in one embodiment, another summation element 287 is further provided in the phase angle generator 270. The summation element 287 combines the phase angle correction signal 296 and the phase angle displacement signal 285 and produces a combined phase angle signal 289. In one embodiment, the combined phase angle signal 289 is directly supplied to the summation element 262 for generation of the phase command signal 216. In another embodiment, the combined phase angle signal 289 may be supplied to a limiter 288. The limiter 288 is configured for constraining the combined phase angle signal 289 within an upper phase angle limit and a lower phase angle limit. One purpose of limiting the phase angle signal 289 is to ensure the power conversion system 10 can ride-through transient events. The output from the limiter 288 is combined in the summation element 262 with the phase angle reference signal 284 for generation of the phase angle command signal 216.

Figure 12:
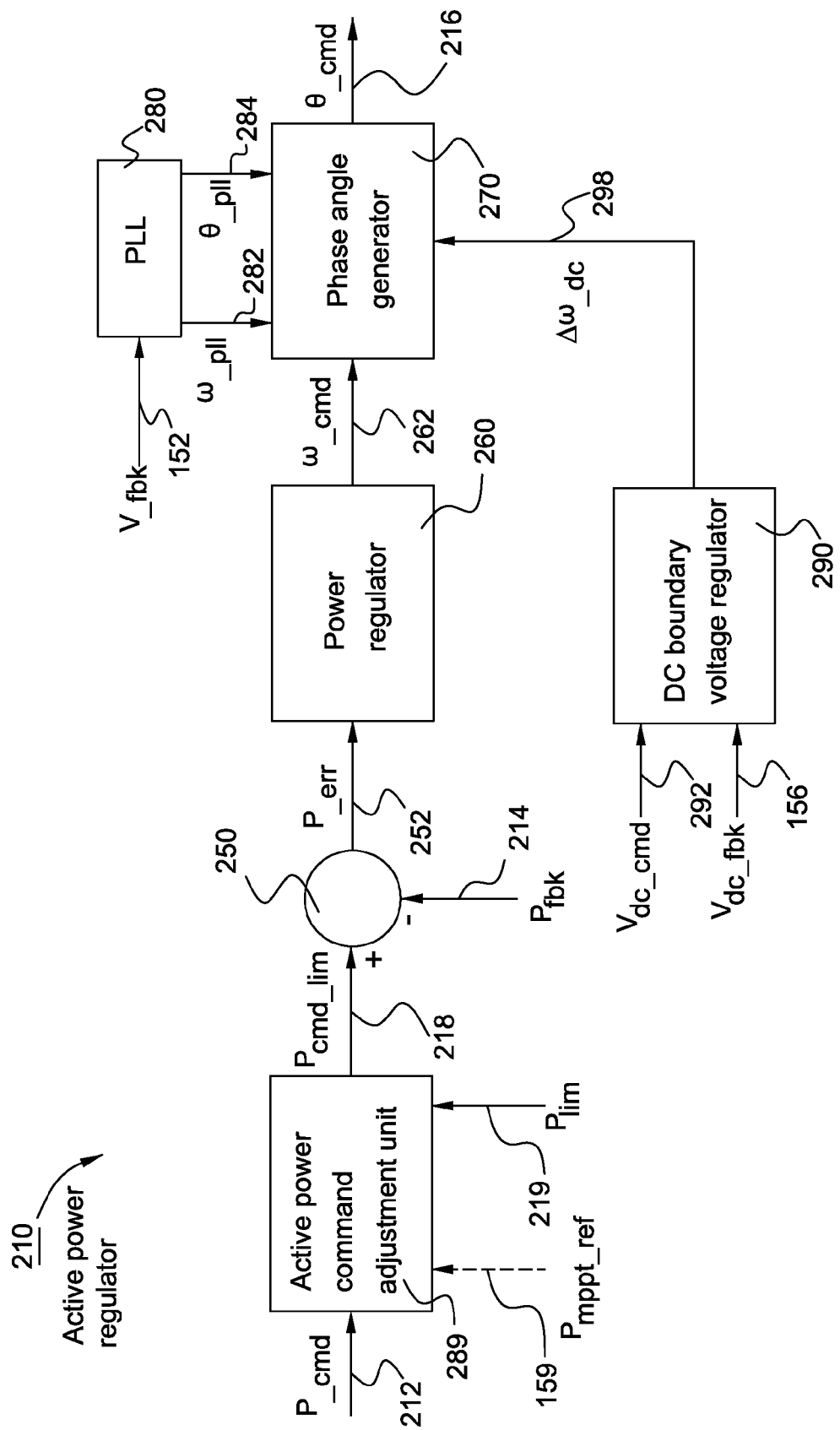
FIG. 12 is a detailed control diagram of a DC boundary voltage regulator shown in FIG. 9 in accordance with another exemplary embodiment of the present disclosure.

FIG. 12 illustrates a detailed control diagram of the active power regulator 210 shown in FIG. 2 in accordance with yet another embodiment of the present disclosure. The control diagram in FIG. 12 is similar to the control diagram in FIG. 9. One difference is that the DC boundary voltage regulator 290 generates a frequency correction signal 298 according to the DC command signal 292 and the DC feedback signal 156 rather than a phase angle correction signal. Referring back to FIG. 11, the frequency correction signal 298 may be supplied to the summation element 286 for generation of the frequency error signal 281 and further generation of the frequency command signal 262 and phase angle command signal 216.

Figure 13:
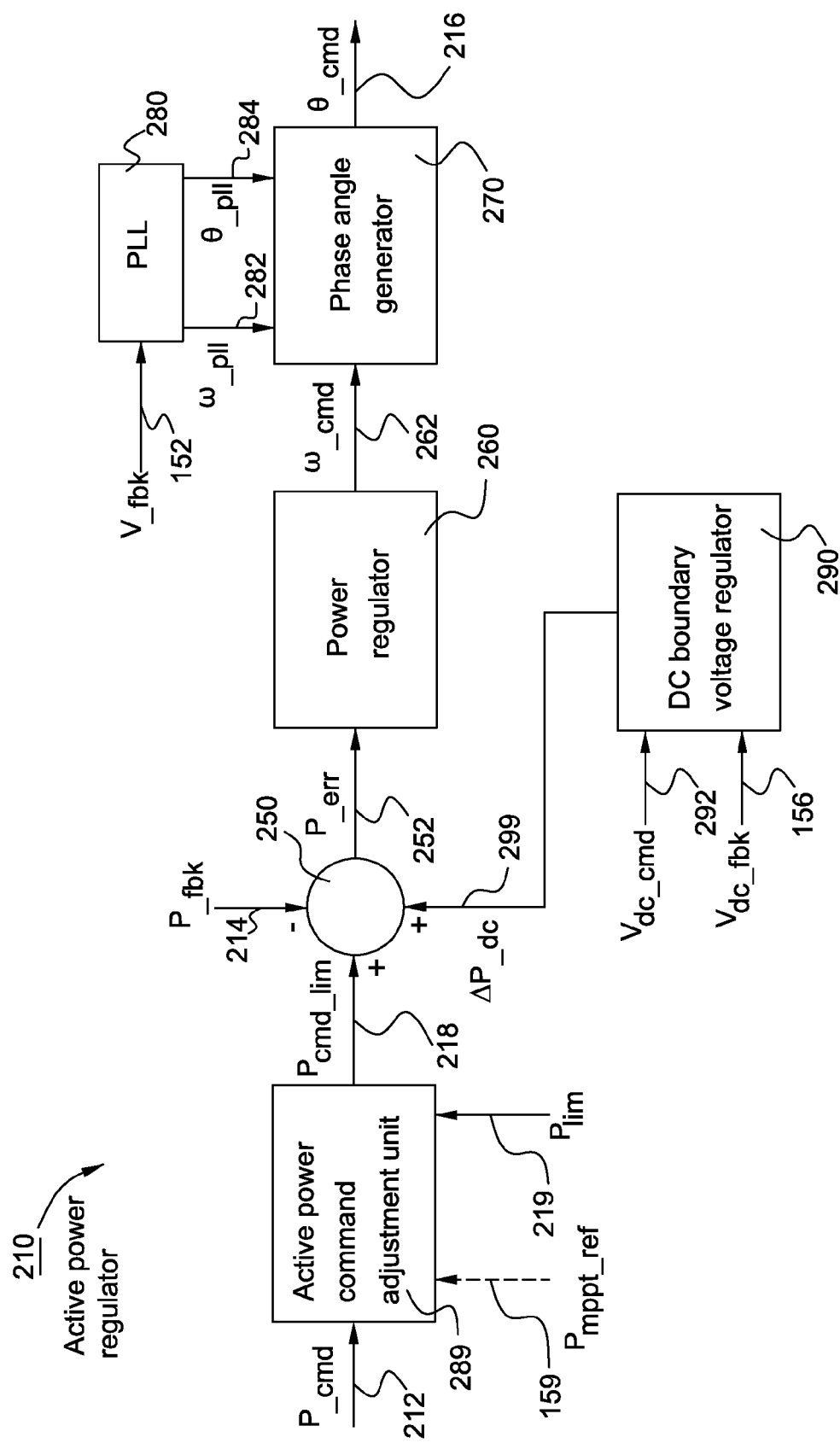
FIG. 13 a detailed control diagram of a DC boundary voltage regulator shown in FIG. 9 in accordance with an exemplary embodiment of the present disclosure.

FIG. 13 illustrates a detailed control diagram of the active power regulator 210 shown in FIG. 2 in accordance with still another embodiment of the present disclosure. The control diagram in FIG. 13 is similar to the control diagram in FIG. 9 and FIG. 12. One difference is that the DC boundary voltage regulator 290 generates a power correction signal 299 according to the DC command signal 292 and the DC feedback signal 156. The power correction signal 299 is supplied to the summation element 250 for generation of the power error signal 252 and further generation of the frequency command signal 262 and phase angle command signal 216.

Referring back to FIG. 2, the reactive power regulator 220 of the line side controller 164 receives a reactive power command signal 222 and a feedback reactive power signal 224 and generates a voltage magnitude signal 226 based at least on the reactive power command signal 222 and the feedback reactive power signal 224. The reactive power command signal 222 represents the desired reactive power delivered between the output of the line side converter 144 (see FIG. 1) and the grid 18 and may be dictated by a grid operator. The reactive power feedback signal 224 is the actual measured reactive power delivered between the output of the line side converter 144 and the grid 18. The reactive power feedback signal 224 may be obtained by multiplying a feedback current signal 154 and a feedback voltage signal 152. The voltage magnitude command signal 226 represents a desired voltage magnitude of the AC voltage of the line side converter 144. The AC voltage of the line side converter 144 may be an AC voltage at the output terminal of the line side converter 144. Alternatively, the AC voltage may be an internal voltage of the line side converter 144 by taking into consideration the internal impedance of the line side converter 144.

Figure 14:
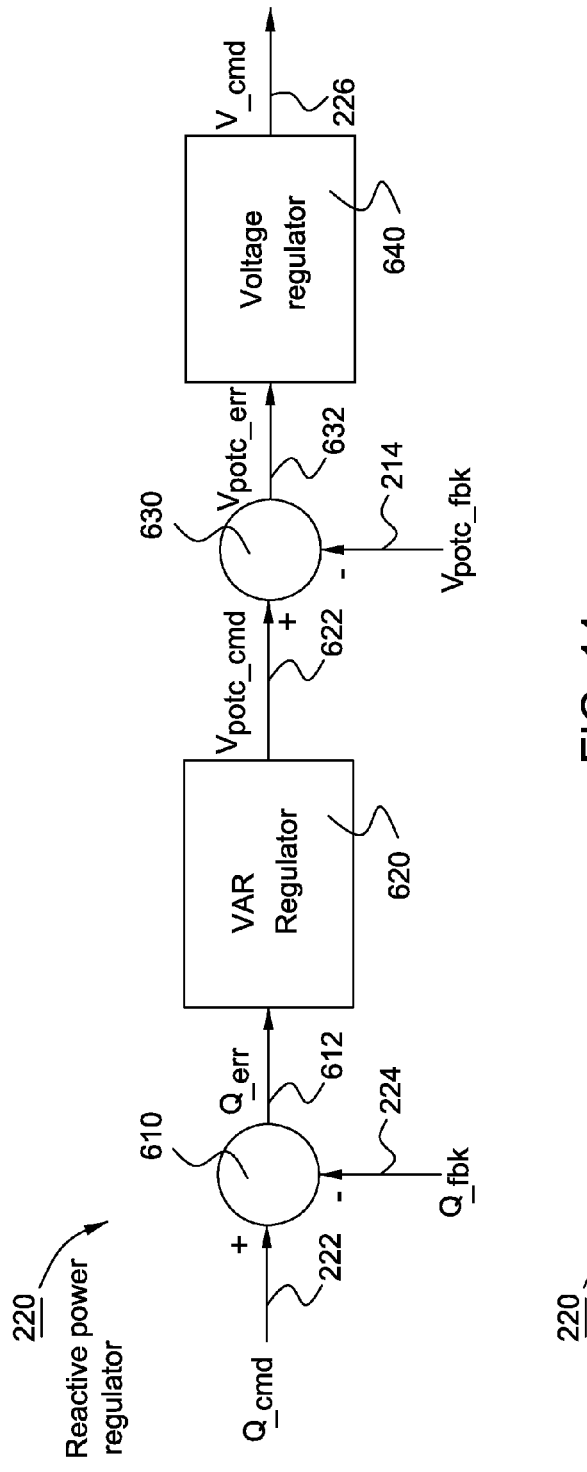
FIG. 14 is a detailed control diagram of a reactive power regulator shown in FIG. 2 in accordance with an exemplary embodiment of the present disclosure.

FIG. 14 illustrates a detailed control diagram of the reactive power regulator 220 of FIG. 2 in accordance with an exemplary embodiment. In the illustrated embodiment, the reactive power regulator 220 includes a first summation element 610, a VAR regulator 620, a second summation element 630, and a voltage regulator 640. The first summation element 610 subtracts the reactive power feedback signal 224 from the reactive power command 222 and generates a reactive power error signal 612. The VAR regulator 620 generates a grid voltage command signal 622 according to the reactive power error signal 312. The grid voltage command signal 622 represents a desired voltage to be achieved at or adjacent to the grid 18. The second summation element 330 subtracts a grid voltage feedback signal 214 from the grid voltage command signal 622 and produces a voltage error signal 632. The voltage regulator 640 generates the voltage magnitude command signal 226 according to the voltage error signal 632.

Figure 15:
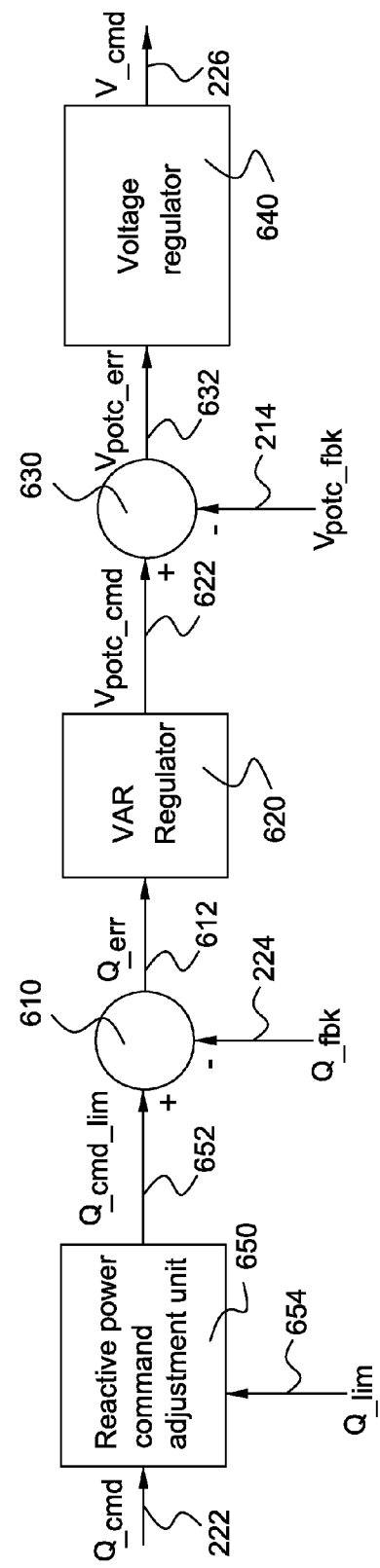
FIG. 15 is a detailed control diagram of a reactive power regulator shown in FIG. 2 in accordance with an exemplary embodiment of the present disclosure.

FIG. 15 illustrates a detailed control diagram of the reactive power regulator 220 shown in FIG. 2 in accordance with another exemplary embodiment. The control diagram is similar to the control diagram shown in FIG. 14. As an alternative embodiment, a reactive power command adjustment unit 650 is further provided in FIG. 15. The reactive power command adjustment unit 650 is configured to limit the reactive power command signal 222 according to a reactive power limit signal 654 and generate a limited reactive power command signal 652 accordingly. The limited reactive power command signal 652 is used for following regulation as noted above with respect to FIG. 14 to generate the voltage magnitude command signal 226. One of the purposes of including the reactive power command adjustment unit 650 is to ensure the power conversion system 10 can provide desired reactive current to the grid 18 during transient events.

Referring back to FIG. 2, in one embodiment, the current limiter 230 comprises a phasor current limiter and is configured to provide limits on the phase angle command signal 216 generated from the active power regulator 210 in reference to FIGS. 3-13. The phasor current limiter 230 is also configured to provide limits on the voltage magnitude command signal 226 generated from the reactive power regulator 220 in reference to FIGS. 14-15. When a transient event occurs at the power grid 18, either one or both of the phase angle command signal 216 and the voltage magnitude command signal 226 is limited by the phasor current limiter 230 in accordance with various command and signals, such as by an electrical current threshold signal 231 for example. The resulting limited phase angle command signal 232 generated from the phasor current limiter 230 or limited voltage magnitude command signal 234 then are used by the signal generator 240 to adjust the line side control signals 168 (shown in FIG. 1). As such, during transient events, the current flowing from the line side controller 144 is indirectly controlled by regulating the AC voltage associated with the line side controller 144. In other words, the power conversion system 10 can ride-through the transient events by reducing or eliminating the possibility that the semiconductor devices residing in the line side converter 144 are damaged due to overcurrent problems.

Hereinafter, with reference to FIGS. 16-18, a detailed description will be provided as to how the phasor current limiter 230 is implemented to provide limits on the phase angle command signal 216 and the voltage magnitude command signal 226.

Figure 16:
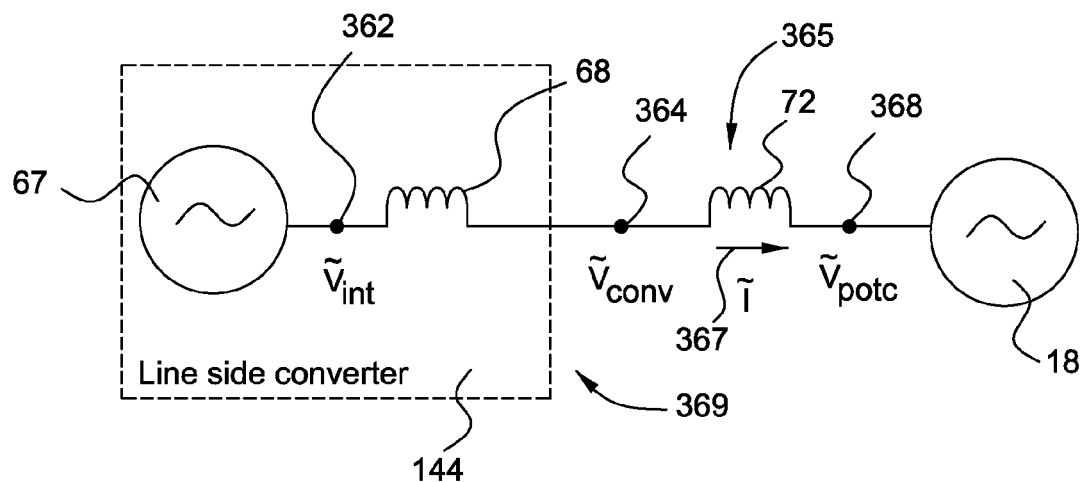
FIG. 16 is a simplified circuit model of a line side converter in association with a grid in accordance with an exemplary embodiment of the present disclosure.

FIG. 16 illustrates a simplified circuit model of a line side converter 144 in association with the grid 18. The line side converter 144 is simplified as including an internal voltage source 67 and internal impedance 68. The voltage source 67 outputs an internal voltage 362 at a point where the voltage source 67 and the internal impedance 68 are connected. The internal voltage source 67 outputs a terminal voltage 364 at a point where the internal impedance 68 and grid impedance 72 are connected. The point where the grid impedance 72 and the grid 18 are connected is the grid voltage 368. It is understood the terminal voltage 364 of the line side converter 144 can be derived based on the grid voltage 368 and the voltage drop 365 across the grid impedance 72. The voltage drop 365 across the grid impedance can be derived from the current 367 flowing through the grid impedance 72 and the grid impedance 72. In one embodiment, the current 367 flowing through the grid impedance 72 can be managed by controlling the terminal voltage 364 of the line side converter 144. Further, by taking into consideration of the internal impedance 68, the internal voltage 362 of the line side converter 144 can be derived based on the grid voltage 368 and the voltage drop 369 across the internal impedance 68 and the grid impedance 72. In one example, the current 367 flowing through the internal impedance 68 and the grid impedance 72 can be managed by controlling the internal voltage 362 of the line side converter 144.

Figure 17:
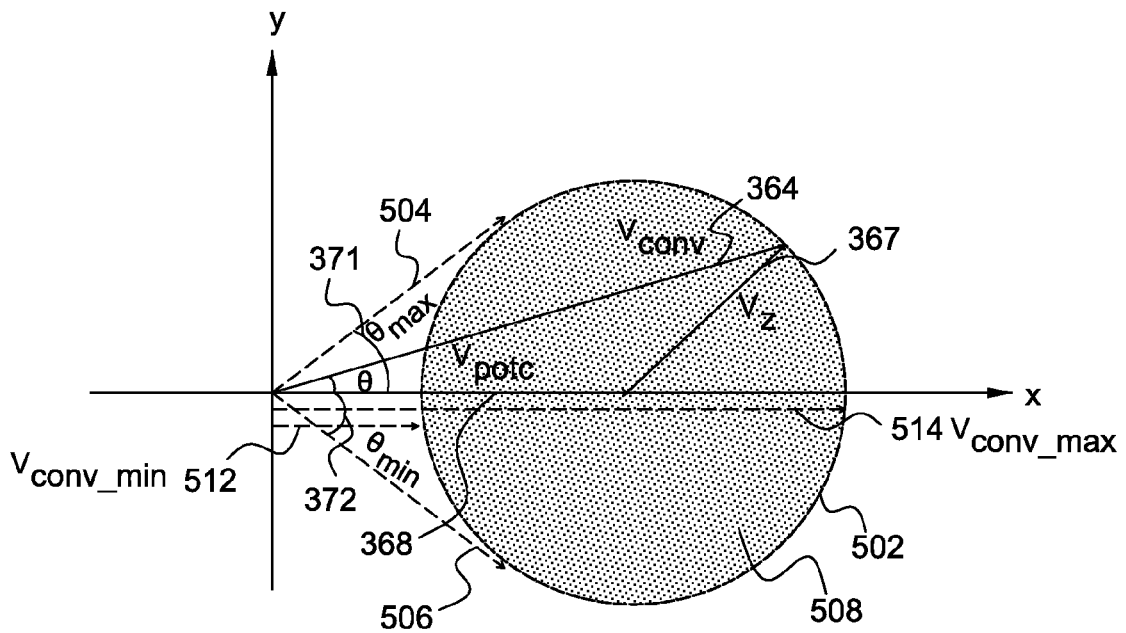
FIG. 17 is a phasor diagram representing an implementation of a phasor current limiter in accordance with an exemplary embodiment of the present disclosure.

FIG. 17 illustrates a phasor diagram of the terminal voltage 364, the grid voltage 368, and the voltage drop 367 across the grid impedance 72. In FIG. 17, a voltage capability curve 502 is illustrated as a dashed circle. The center of the capability curve 502 is defined by the end point of the grid voltage 368. The radius of the capability curve 502 is defined by a maximum allowable voltage drop across the grid impedance 72. The maximum allowable voltage drop can be derived from a maximum allowable current and the grid impedance 72. The terminal voltage 364 should be controlled to have its endpoint positioned on the dashed circle 502 or within a circular region 508 encircled by the dashed circle 502. Thus, the phase angle difference between the terminal voltage 364 and the grid voltage 368 should be controlled within a maximum phase angle 371 and a minimum phase angle 372. The maximum phase angle 371 is defined by a dashed line 504 extending from the origin tangent to the upper portion of the capability curve 502. The minimum phase angle 372 is defined by a dashed line 506 extending from the origin tangent to the lower portion of the capability curve 502. Further, the magnitude of the terminal voltage 364 of the line side converter 144 should be controlled within a maximum voltage threshold and a minimum voltage threshold. The minimum voltage threshold is defined by a dashed line 512 extending from the origin to a point where the horizontal axis X crosses the left portion of the capability curve 502. The maximum voltage threshold is defined by a dashed line 514 extending from the origin to a point where the horizontal axis X crosses the right portion of the capability curve 502.

Figure 18:
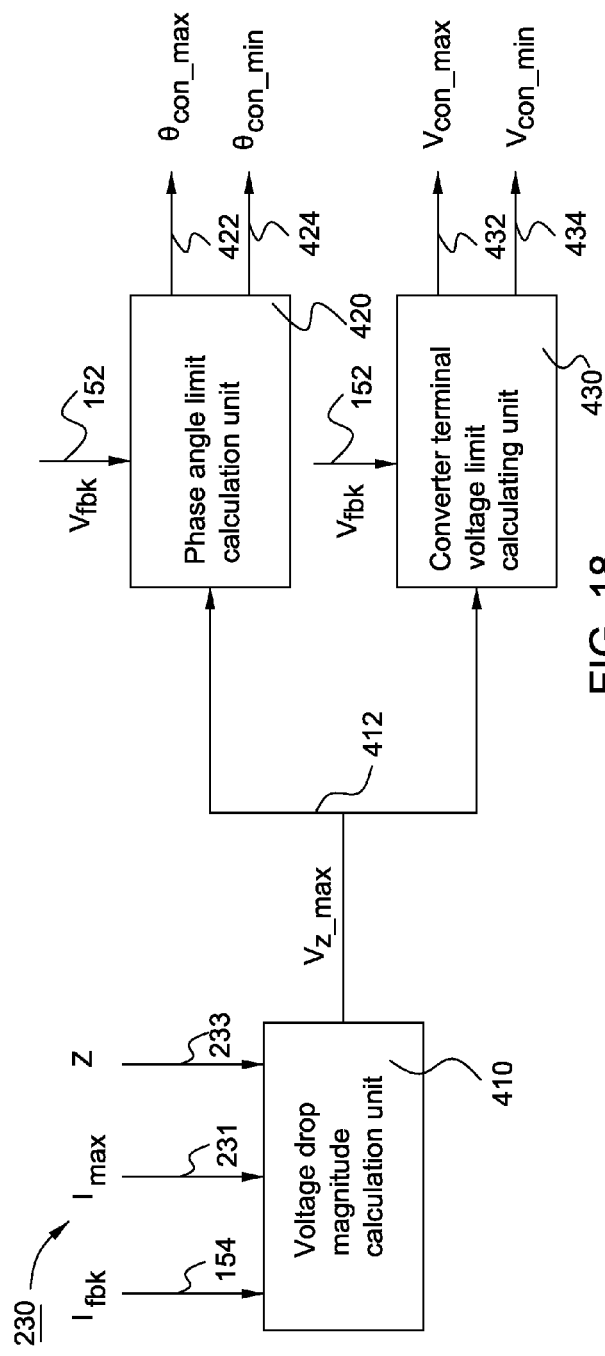
FIG. 18 is a detailed control diagram of a phasor current limiter in accordance with an exemplary embodiment of the present disclosure.

FIG. 18 illustrates a detailed block diagram of the phasor current limiter 230 shown in FIG. 2 in accordance with an exemplary embodiment. In the illustrated embodiment, the phasor current limiter 230 includes a first calculation unit 410, a second calculating unit 420, and a third calculating unit 430. The first calculating unit 410 is configured to calculate a maximum voltage drop 412 across the grid impedance 72 according to the maximum allowable current signal 231 and the impedance value 233 of the grid impedance 72. The maximum allowable current signal 231 may be obtained according to current ratings of the line side converter 144. The impedance value 233 may be obtained by using current error signal through PI controller. The calculated maximum allowable voltage drop 412 is supplied to the second calculation unit 420 and the third calculation unit 430. The second calculation unit 420 calculates a maximum phase angle limit signal 422 and a minimum phase angle limit signal 424 according to the maximum allowable voltage drop 412 and a grid voltage feedback signal 228. The third calculation unit 430 calculates a maximum voltage magnitude signal 432 and a minimum voltage magnitude signal 434 according to the maximum allowable voltage drop 412 and the grid voltage feedback signal 228.

Figure 19:
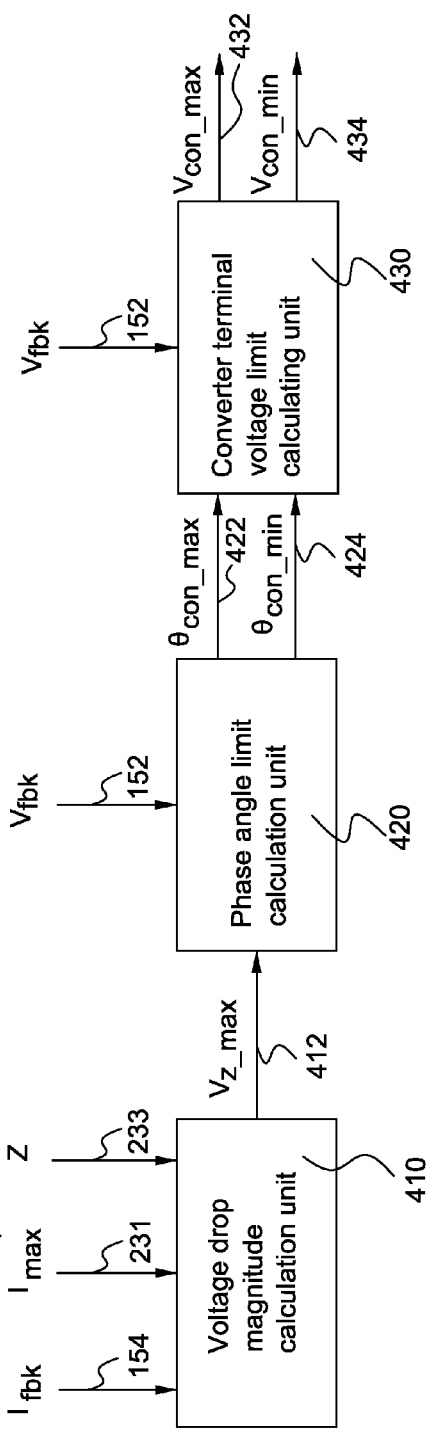
FIG. 19 is a detailed control diagram of a phasor current limiter in accordance with another exemplary embodiment of the present disclosure.

FIG. 19 illustrates another exemplary embodiment of the phasor current limiter 230 shown in FIG. 2. In the illustrated embodiment, the maximum phase angle limit signal 422 and the minimum phase angle limit signal 424 generated from the second calculation unit 420 are further used for calculating the maximum voltage magnitude signal 432 and the minimum voltage magnitude signal 434 by the third calculation unit 430. It can be understood that the voltage magnitude threshold of the terminal voltage 364 can be more easily calculated as the phase angle is limited within the maximum phase angle and the minimum phase angle.

As described above with respect to FIGS. 18-19, the maximum phase angle limit signal 422 and the minimum phase angle limit signal 424 derived from the phasor current limiter 230 are used to limit the phase angle command signal 216 (see FIG. 2) generated from the active power regulator 210, and a limited phase angle command signal 232 (see FIG. 2) is produced. In addition, the maximum voltage magnitude signal 432 and the minimum voltage magnitude signal 434 are used to limit the voltage magnitude command signal 226 (see FIG. 2), and a limited voltage magnitude command signal 234 (see FIG. 2) is produced. The limited phase angle command signal 232 and the limited voltage magnitude command signal 234 are supplied to the signal generator 240, which generates the line side control signals 168 for the line side converter 144. In one implementation, the signal generator 240 may be a pulse width modulation (PWM) signal generator for generating PWM pattern signals for the line side control signals 168. Because the line side control signals 168 are generated based at least in part on the maximum allowable current, the current flowing from the line side converter 144 can this be managed. As a result, the power conversion system 10 can ride-through the transient events.

Figure 20:
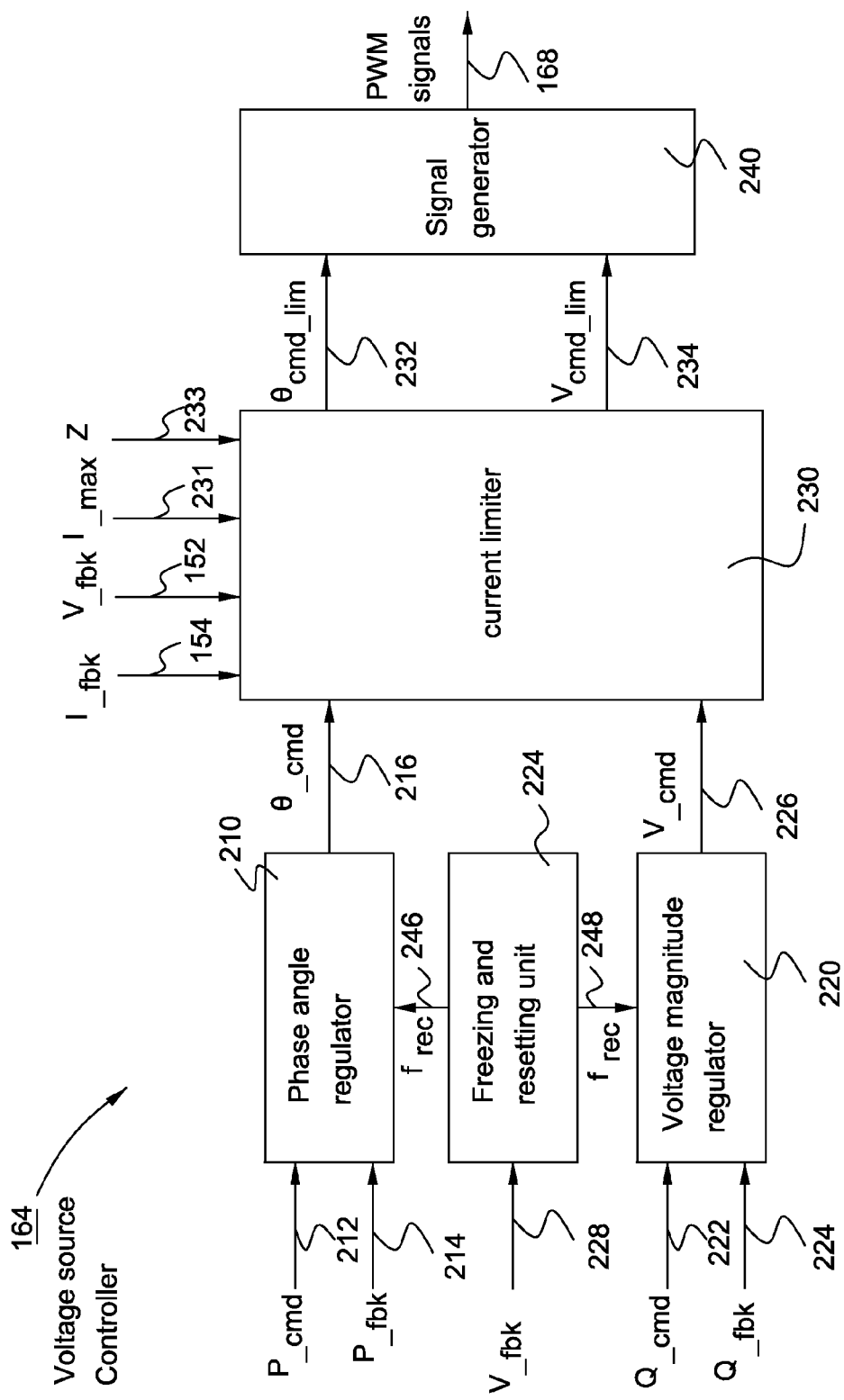
FIG. 20 is a control diagram implemented by a line side controller shown in FIG. 1 in accordance with another exemplary embodiment of the present disclosure.

FIG. 20 illustrates detailed control diagram of the line side controller 164 shown in FIG. 1 in accordance with another exemplary embodiment. The control diagram shown in FIG. 20 is similar to the control diagram shown in FIG. 2. One of the differences is that a freezing and resetting unit 244 is further provided in the line side controller 164. In general, the freezing and resetting unit 244 is configured to freeze one or more integrating elements in association with the line side controller 164 while the power conversion system 10 is recovering from the transient events. The freezing and resetting unit 244 is further configured to reset these integrators after recovery. In one embodiment, as shown in FIG. 20, the freezing and resetting unit 244 is coupled to the active power regulator 210 and the reactive power regulator 220. The freezing and resetting unit 244 receives the grid voltage feedback signal 228 and generates freezing signals 246, 248 used to freeze one or more integrating elements in association with the active power regulator 210 and the reactive power regulator 220.

Figure 21:
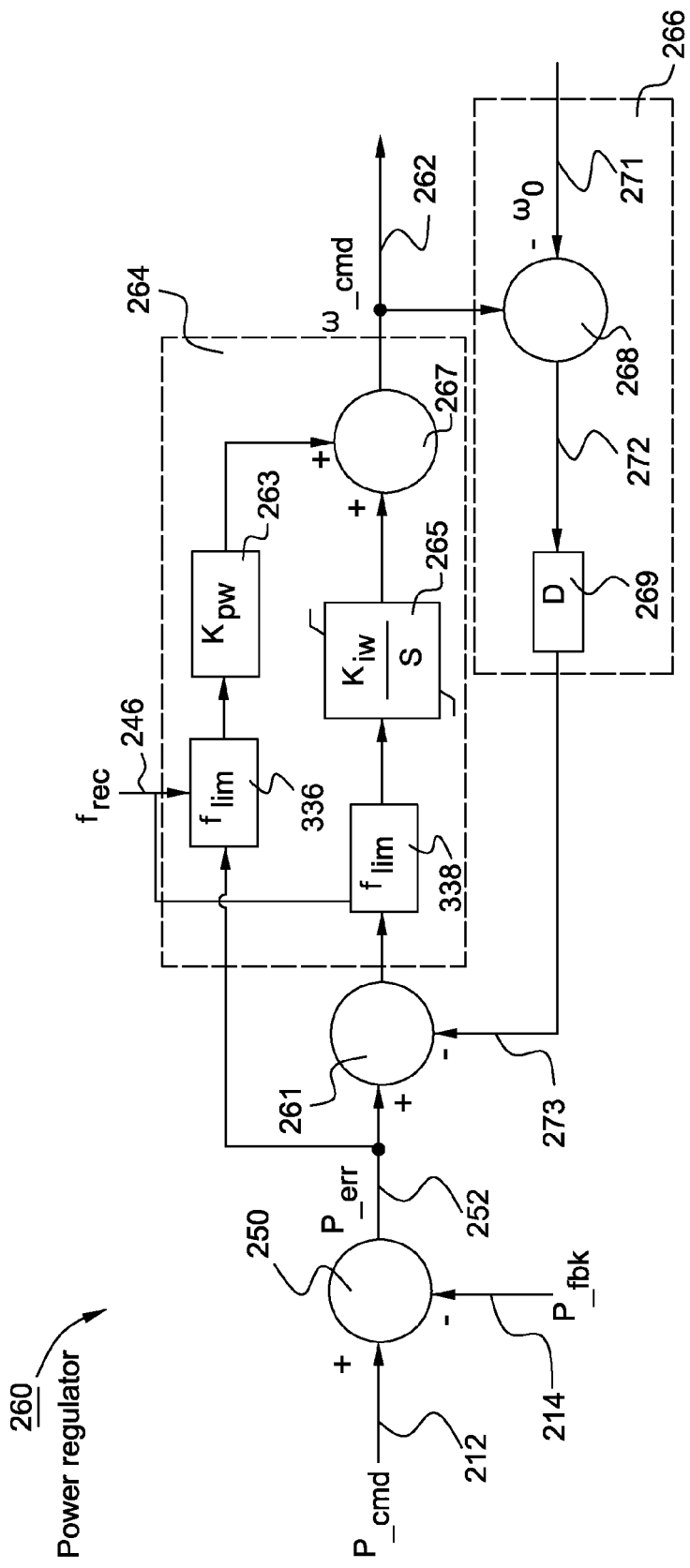
FIG. 21 is a detailed control diagram of a power regulator of the active power regulator shown in FIG. 3 in accordance with another exemplary embodiment of the present disclosure.

FIG. 21 illustrates a detailed control diagram of a power regulator 260 of the active power regulator 210 in which an anti-windup feature is included. The control diagram shown in FIG. 21 is similar to the control diagram shown in FIG. 4. One of the differences is that two switching devices 336, 338 are included in the PI controller 264 of the power regulator 260. The switching devices 336, 338 can be switched off in response to the freezing signal 246 indicating that the power conversion system 10 is recovering from a transient event. When there is no transient event or the particular transient event has ended, the switching devices 336, 338 can be switched on, such that the PI controller 264 can perform normal operations.

Figure 22:
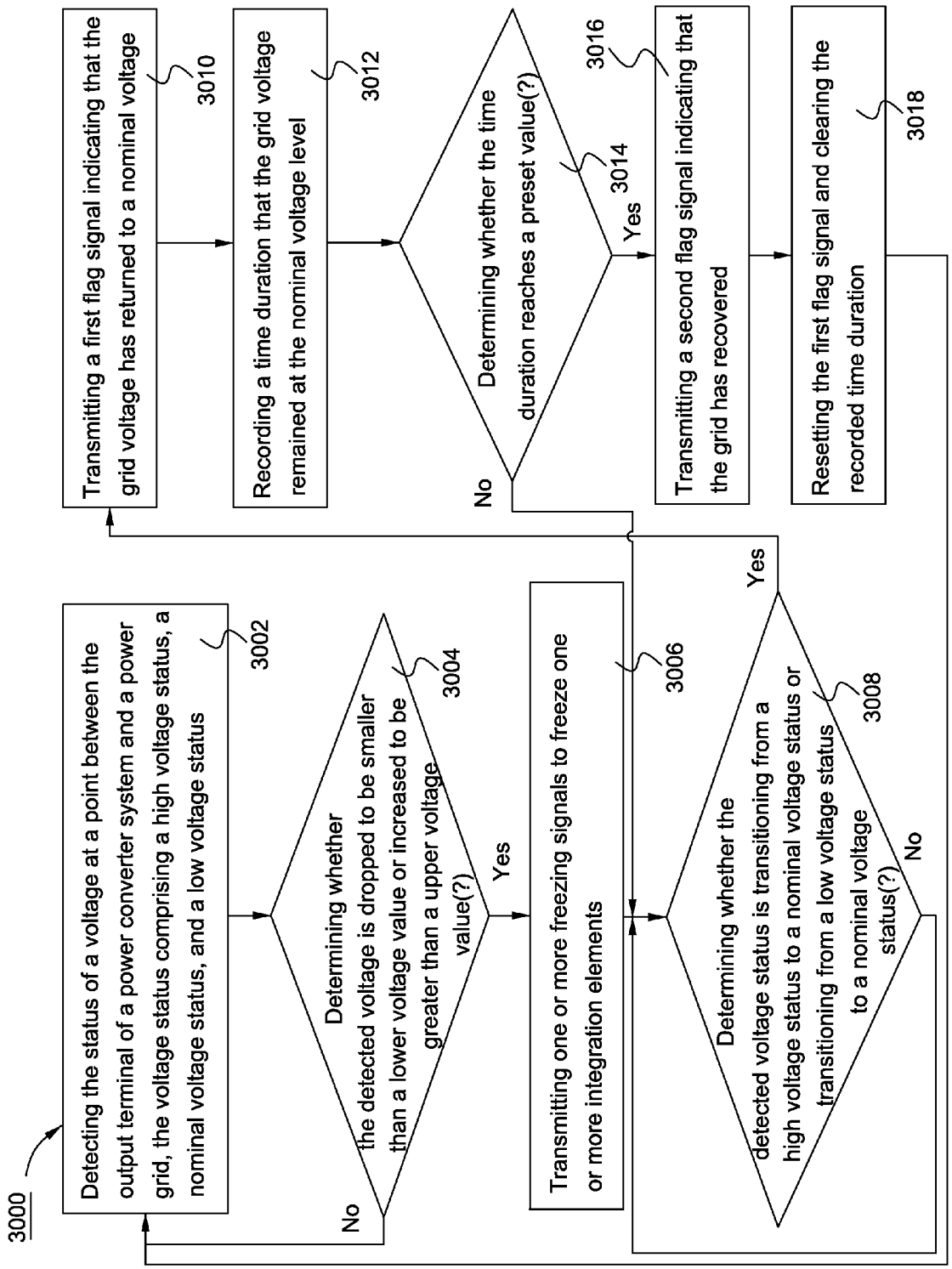
FIG. 22 is a flowchart of a method for freezing and resetting one or more integrating elements during transient events and recovering process in accordance with an exemplary embodiment of the present disclosure.

FIG. 22 illustrates a flowchart of a method for freezing and resetting the power conversion system in accordance with an exemplary embodiment. The method 3000 may be programmed with software instructions stored in a computer-readable medium, which when executed by a processor, perform various steps of the method 3000. The computer-readable medium may include volatile and nonvolatile, removable and non-removable media implemented in any method or technology. The computer-readable medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can accessed by an instruction execution system.

In one implementation, the method 3000 may begin at block 3002. At block 3002, a status of the voltage at a point between the output terminal of the power converter and the power grid is detected. The detected voltage status may comprise a high voltage status, a nominal voltage status, and a low voltage status. More specifically, as a non-limiting example, the high voltage status may represent that the grid voltage is 1.1 times larger than a rated voltage. The nominal voltage status may represent that the grid voltage is larger than 0.9 times the rated voltage and smaller than the 1.1 times the rated voltage. The low voltage status may represent that the grid voltage is smaller than 0.9 times the rated voltage.

At block 3004, a first determination is made as to whether the detected voltage is dropped to a value smaller than a lower voltage value or increased to a value greater than an upper voltage value. In one embodiment, the lower voltage value may be 0.9 times the rated voltage and the upper voltage value may be 1.1 times the rated voltage. If the determination is positive, it means that the power conversion system is entering into a transient event or is experiencing a fault condition. Following the positive determination, the procedure goes to block 3006. If the determination is negative, it means that the power conversion system is operating normally, and the procedure returns to block 3002 for continuing detecting the voltage status.

At block 3006, a freezing signal is sent upon determination the power conversion system is entering into a transient event or is experiencing a fault condition. In one embodiment, as shown in FIG. 20, freezing signals 246 and 248 are transmitted from the freezing and resetting unit 244 to freeze one or more integrating elements associated with the active power regulator 210 and the reactive power regulator 220.

At block 3008, a second determination is made as to whether the detected voltage status is transitioning from a high voltage status to a nominal voltage status or transitioning from a low voltage status to a nominal voltage status. If yes, the procedure goes to block 3010, and if not, the procedure goes back to block 3008 again.

At block 3010, once a nominal voltage status has been reached, a first flag signal is sent. The first flag signal indicates the grid voltage has returned to a nominal voltage.

At block 3012, a time duration is recorded to represent that time period during which the grid voltage remained at the nominal voltage level.

At block 3014, a third determination is made as to whether the time duration that the grid voltage remained at the nominal voltage level reaches a preset time value. In one embodiment, as a non-limiting example, the present time value may be 10 milliseconds. If the time duration that the grid voltage remained at the nominal voltage level is determined to reach the preset time value, the procedure goes to block 3016, and if not, the procedure goes to back block 3008 to verify whether recovery is still in progress.

At block 3016, a second flag signal is sent. The second flag signal indicates the grid voltage has remained at the nominal voltage for a preset time value. In this case, the power conversion system can be determined to be truly recovering from the transient event or fault condition. With the first flag signal sent at block 3010 and the second flag signal sent at block 3016, the integrating elements of power conversion system that have been frozen at block 3006 can be reset to perform normal integration operations.

At block 3018, after the recovery process, the first flag signal is reset and the recorded time duration is cleared for following determination of the recovery of the power conversion system. After block 3018, the procedure returns to block 3002 for further determining the voltage status.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power conversion system, comprising:
a DC bus for receiving direct current (DC) power;
a line side converter coupled to the DC bus for converting the DC power on the DC bus to alternating current (AC) power; and
a voltage source controller for providing control signals to the line side converter to enable the line side converter to regulate the AC power, the voltage source controller comprising:
a signal generator to generate the control signals for the line side converter based at least in part on a power command signal and a power feedback signal;
an active power regulator for generating an internal frequency command signal based on the power command signal and the power feedback signal, and for generating a phase angle command signal by integrating the internal frequency command signal;
a current limiter to, during a transient event, adjust the phase angle command signal based at least in part on an electrical current threshold; and
a voltage limiter for adjusting the phase angle command signal based at least in part on a DC bus voltage feedback signal and a DC boundary voltage threshold during the transient event,
wherein the voltage source controller is configured to use the phase angle command signal when generating the control signals.

2. The power conversion system of claim 1, wherein the power conversion system further comprises a maximum power point tracking (MPPT) device for generating an MPPT power reference signal, wherein the voltage source controller further comprises a power command adjustment unit configured to constrain the power command signal according to the MPPT power reference signal.

3. The power conversion system of claim 1, wherein the voltage source controller further comprises a freezing unit for determining whether the power conversion system is entering the transient event or recovering from the transient event by detecting a feedback voltage at the output of the line side converter, and generating a status signal used to freeze one or more integrating elements of the active power regulator until the power conversion system is determined to be recovered from the transient event.

4. The power conversion system of claim 1, the current limiter is configured to calculate a voltage magnitude threshold based at least in part on the electrical current threshold and an impedance at the output terminal of the line side converter, and further to calculate a phase angle limit signal for the phase angle command signal based at least in part on the calculated voltage magnitude threshold and a feedback grid voltage.

5. The power conversion system of claim 1, wherein the power conversion system further comprises a phase locked loop (PLL) circuit for generating a frequency reference signal or a phase angle reference signal of a grid voltage, and the active power regulator is further configured for generating the phase angle command signal by adjusting the internal frequency command signal according to the frequency reference signal or adjusting the phase angle command signal according to the phase angle reference signal.

6. The power conversion system of claim 1, wherein the voltage limiter is further configured to provide a frequency correction signal for the internal frequency command signal or a phase angle correction signal for the phase angle command signal based on the DC bus voltage feedback signal and the DC boundary voltage threshold.

7. The power conversion system of claim 1, wherein the voltage source controller further comprises a reactive power regulator for generating a voltage magnitude command signal based on a reactive power command signal and a reactive power feedback signal obtained by measuring the AC power output from the line side converter, and wherein the voltage source controller is configured to use the voltage magnitude command signal when generating the control signals provided to the line side converter.

8. The power conversion system of claim 7, wherein the voltage source controller further comprises a freezing unit for determining whether the power conversion system is entering the transient event or recovering from the transient event by receiving a feedback voltage at the output of the line side converter, and for generating a status signal to freeze one or more integrating elements of the reactive power regulator until the power conversion system is determined to be recovered from the transient event.

9. The power conversion system of claim 7, wherein the current limiter is configured to calculate a voltage. magnitude threshold based at least in part on the electrical current threshold and an impedance at the output terminal of the line side converter, and further to calculate a voltage magnitude limit on the voltage magnitude command signal based at least in part on the calculated voltage magnitude threshold and a feedback grid voltage.

10. The power conversion system according to claim 7, wherein the current limiter is configured to calculate a voltage magnitude threshold based at least in part on the electrical current threshold and an impedance at the output terminal of the line side converter, to calculate a phase angle limit based at least in part on the voltage threshold and a feedback grid voltage, and to calculate a voltage magnitude limit on the voltage magnitude command signal based at least in part on the phase angle limit, the calculated voltage magnitude threshold.

11. A method of operating a line side converter in a power conversion system, the method comprising:
generating control signals for the line side converter based at least in part on a power command signal and a power feedback signal, said generation comprising:
generating an internal frequency command signal based on the power command signal and the power feedback signal;
integrating the internal frequency command signal to generate a phase angle command signal for use when generating the control signals;
limiting, during a transient event, the phase angle command based at least in part on an electrical current threshold and a DC bus boundary voltage threshold;
generating the control signals based on the limited phase angle command; and
applying the control signals to the line side converter.

12. The method of claim 11, further comprising:
freezing one or more integrating elements of the power conversion system upon determination that the power conversion system is experiencing the transient event; and
resetting the one or more integrating elements of the power conversion system upon determination that the power conversion system has recovered.

13. The method of claim 11, further comprising:
calculating a voltage magnitude threshold based at least in part on the electrical current threshold and an impedance at the output terminal of the line side converter;
calculating a phase angle limit signal based at least in part on the calculated voltage threshold and a feedback grid voltage;
providing a limit on the phase angle command signal using the phase angle limit signal.

14. The method of claim 11, further comprising:
using a phase locked loop (PLL) circuit for generating a frequency reference signal or a phase angle reference signal of a grid voltage;
adjusting the internal frequency command signal according to the frequency reference signal or adjusting the phase angle command signal according to the phase angle reference signal.

15. The method of claim 11, further comprising:
generating a voltage magnitude command signal based on a reactive power command signal and a feedback reactive power signal obtained by measuring the AC power output from the line side converter, and using the voltage magnitude command signal when generating the control signals.

16. The method of claim 11, further comprising:
calculating a voltage magnitude threshold based at least in part on the electrical current threshold and an impedance at the output terminal of the line side converter;
calculating a voltage magnitude limit based at least in part on the calculated voltage magnitude threshold and a feedback grid voltage;
providing a limit on the voltage magnitude command signal using the voltage magnitude limit.

17. The method of claim 11, further comprising:
calculating a voltage magnitude threshold based at least in part on the electrical current threshold and an impedance at the output terminal of the line side converter;
calculating a phase angle limit based at least in part on the voltage magnitude threshold and a feedback grid voltage;
calculating a voltage magnitude limit based at least in part on the phase angle limit;
providing a limit on the voltage magnitude command signal using the voltage magnitude limit.

18. A solar power conversion system, comprising:
a photovoltaic (PV) power source for outputting direct current (DC) power;
a DC bus for receiving the DC power from the PV power source;
a line side converter electrically coupled to the DC bus for converting the DC power on the DC bus to alternating current (AC) power; and
a voltage source controller configured to:
generate a phase angle command based at least in part on a power command signal and a power feedback signal;
limit, during a transient event, the phase angle command based at least in part on an electrical current threshold and a DC boundary voltage limit;
generate the control signals based on the limited phase angle command; and
apply the control signals to the line side converter to limit the electrical current of the line side converter when the power conversion system is experiencing the transient event.

* * * * *